(12) United States Patent
Neiser et al.

(10) Patent No.: US 9,738,455 B2
(45) Date of Patent: Aug. 22, 2017

(54) CONVEYOR SPEED CONTROL

(71) Applicant: INTELLIGRATED HEADQUARTERS LLC, Mason, OH (US)

(72) Inventors: Raymond R. Neiser, Batavia, OH (US); Jerome F. Koch, Cincinnati, OH (US); Andrew John Kelly, Maineville, OH (US); Matt Sollenberger, Loveland, OH (US); Jason A. Johnson, Hamilton, OH (US); Daniel Raymond Napoli, Bedford Corners, NY (US)

(*) Notice: Subject to any disclaimer, the term of this patent is extended or adjusted under 35 U.S.C. 154(b) by 475 days.

(21) Appl. No.: 14/298,165

(22) Filed: Jun. 6, 2014

(65) Prior Publication Data

US 2014/0364998 A1 Dec. 11, 2014

Related U.S. Application Data

(60) Provisional application No. 61/832,321, filed on Jun. 7, 2013, provisional application No. 61/981,413, filed on Apr. 18, 2014.

(51) Int. Cl.
*G06F 7/00* (2006.01)
*B65G 43/08* (2006.01)

(52) U.S. Cl.
CPC ................... *B65G 43/08* (2013.01)

(58) Field of Classification Search
USPC ........................................... 700/230
See application file for complete search history.

(56) References Cited

U.S. PATENT DOCUMENTS

| | | | |
|---|---|---|---|
| 7,121,398 B2 | 10/2006 | Affaticati et al. | |
| 7,909,155 B2 | 3/2011 | Lupton et al. | |
| 2009/0065330 A1* | 3/2009 | Lupton | B65G 43/08 198/357 |
| 2009/0145723 A1 | 6/2009 | Ogawa | |
| 2010/0030373 A1* | 2/2010 | Lee | B65B 35/44 700/223 |
| 2011/0240439 A1 | 10/2011 | Rompe | |

FOREIGN PATENT DOCUMENTS

| | | |
|---|---|---|
| JP | 2012-111577 A | 6/2012 |
| JP | 2013-095594 A | 5/2013 |

OTHER PUBLICATIONS

International Search Report and Written Opinion of the International Searching Authority in PCT Application No. PCT/US2014/041286 dated Sep. 24, 2014.

* cited by examiner

*Primary Examiner* — Kyle Logan

(57) ABSTRACT

Systems, methods, devices, and non-transitory processor readable media of the various embodiments enable intelligent speed control of conveyors (e.g., singulator conveyors, sortation conveyors, etc.) in a material handling system.

42 Claims, 12 Drawing Sheets

CONVEYOR SPEED CONTROL

CROSS REFERENCE TO RELATED APPLICATIONS

This application claims the benefit of priority to U.S. Provisional Patent Application No. 61/832,321 entitled "Usage-Driven Sorter Speed Control" filed Jun. 7, 2013, and to U.S. Provisional Patent Application No. 61/981,413 entitled "Intelligent Speed Controls In Material Handling Systems Including A Singulator" filed Apr. 18, 2014. The entire contents of both applications are hereby incorporated by reference.

FIELD

This disclosure relates generally to a material handling system, and is more particularly directed to efficient control of material handling systems including conveyor systems (e.g., sortation systems, singulator systems, etc.).

BACKGROUND

Based on the configuration of the material handling system, items (e.g., cartons, cases, etc.) may travel through the material handling system in an unregulated fashion (e.g., clustered, overlapping, and/or non-single file flow) at an initial time. However, to aid in sorting items, for example into different divert lanes for shipment via a sortation conveyor, it is often advantageous to align the flow of items into a single file stream. A singulator (or singulator conveyor) is an example of a conveyor that accepts an unregulated flow of items and discharges the items as a single file stream. Singulators are often wide bulk conveyors accepting inputs at various points (for example from one or more collector conveyor) and aligning the input items such that the items are discharged as a single file stream. Singulators often include recirculation lines that convey items that have not been successfully placed into the single file stream (i.e., not singulated) back to the start of the singulator. Singulators often discharge the single file stream of items to a sortation conveyor.

Sortation conveyors have the ability to convey unit loads and selectively divert individual loads being conveyed off at desired destinations alongside the conveyor. Sortation conveyors are commonly used in unit handling for conveying mixed batches of loads and sorting them to planned destinations located along the length of the conveyor. There are several different types of sortation conveyors used for unit load handling applications, such as pop-up skewed wheel sorters, pivot wheel sorters, cross belt/tilt tray sorter, and sliding shoe sorter.

Sliding shoe sorters are very effective at high speeds in that the number and operation of the divert shoes may be configured to gently guide the load to a particular divert lane. Sliding shoe sorters have a carrying surface is made up of conveyor flights (slats or tubes), each of which are attached to a drive chain running just inside each sorter side channel. Sliding divert shoes, which are supported by the conveyor slats, push a load off the flight conveyor at an appropriate sort destination. The number of shoes used to divert a load is determined at induction, depending upon a length of the load. Rates up to 400 cartons per minute can be achieved thereby in part by sorting on minimum gaps between cartons.

BRIEF SUMMARY

The systems, methods, devices, and non-transitory processor readable media of the various embodiments enable intelligent speed control of conveyors (e.g., singulator conveyors, sortation conveyors, etc.) in a material handling system.

In various embodiments, a run rate of a sortation system or conveyor may be periodically changed in relation to its usage. In additional embodiments, adjustment or changes in induction may also be triggered by conditions upstream or downstream of the sortation system or conveyor. In an embodiment, a sortation system or conveyor may be operated at a first run rate, a maximum throughput value of the sortation system at the first run rate may be determined, an actual throughput value of the sortation system may be monitored, a ratio of the actual throughput value to the maximum throughput value may be compared with a first threshold, and the sortation system or conveyor may be operated at a second run rate in response to the ratio being outside of the first threshold.

In an embodiment, the speed of a singulator (or singulator system or singulator conveyor) may be controlled (e.g., increased, decreased, and/or maintained) based on a detection of one or more items on one or more upstream conveyors, such as collector conveyors, feeding the singulator. In an additional embodiment, the speed of a singulator may be controlled (e.g., increased, decreased, and/or maintained) based on a flow state of items downstream of the singulator.

BRIEF DESCRIPTION OF THE DRAWINGS

The accompanying drawings illustrate embodiments of the invention, and, together with specification, including the general description above and the detailed description which follows, serve to explain the features of the present invention.

DETAILED DESCRIPTION

Figure 1:
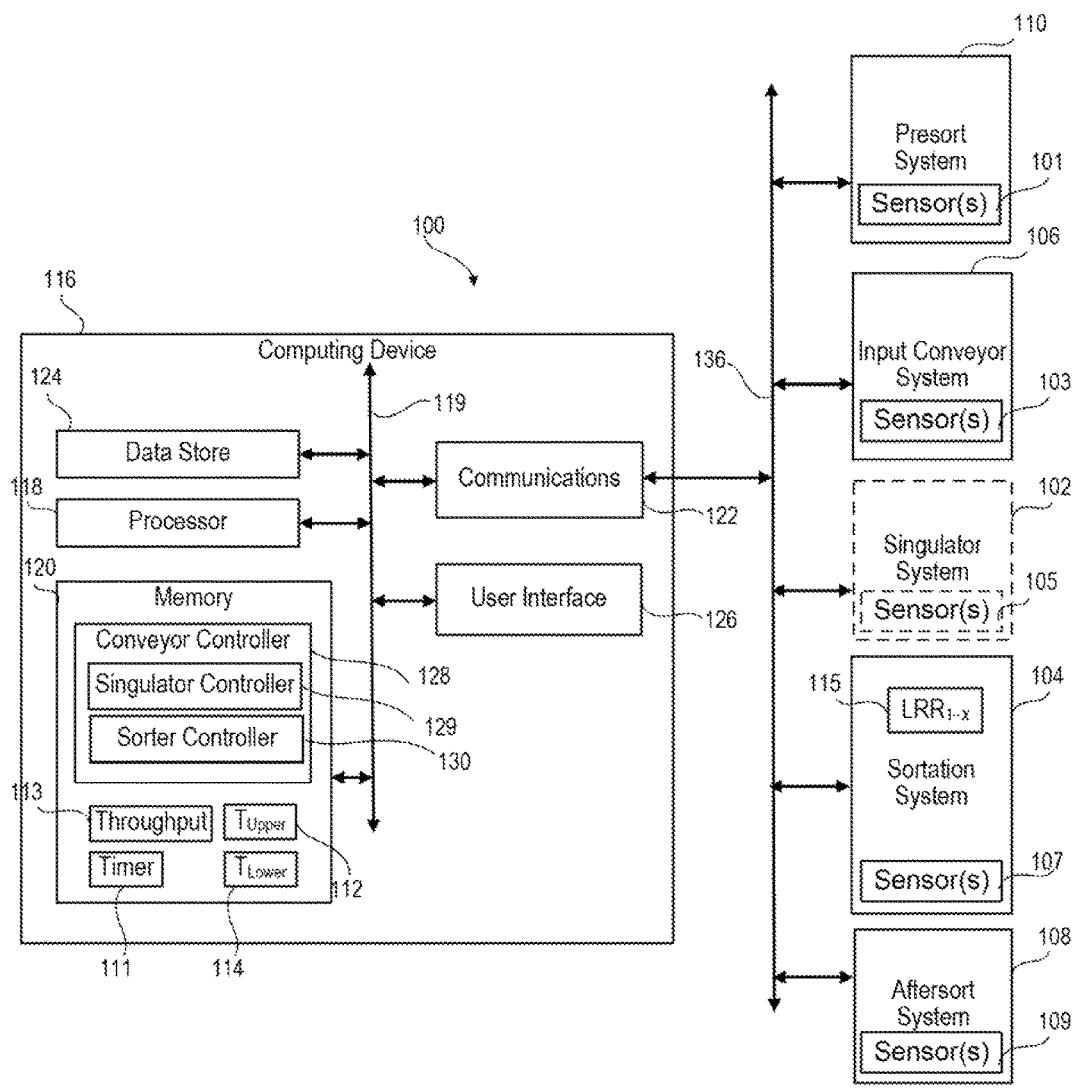
FIG. 1 illustrates a schematic block diagram of a material handling system having conveyor controller according to an embodiment.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, and similar electronic devices equipped with at least a processor configured to perform the various operations described herein.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

Although high speed may be achievable by conveyors, such as sliding shoe sorters, it is believed that there are situations where the conveyors, such as sliding shoe sorters, may be better used at a lower speed in order to reduce noise, power consumption, and mechanical wear. However, such reductions in conveyor speed should not degrade performance of an overall material handling system or operation.

The systems, methods, devices, and non-transitory processor readable media of the various embodiments enable intelligent speed control of conveyors systems (e.g., singulator systems, sortation systems, etc.) in a material handling system. In various embodiments, a run rate of a conveyor (e.g., a speed of a conveyor) may be periodically changed in relation to its usage. In additional embodiments, adjustment or changes in induction may also be triggered by conditions upstream or downstream of the conveyor. The various embodiments may provide methods, systems, non-transitory processor readable media, controllers, and material handling systems that perform multi-speed conveyor operations that dynamically adjust based upon how much of the throughput available at a current run rate may be being used. In various embodiments, the speed of a conveyor may be controlled based on material handling system state inputs from one or more external system, such as a Warehouse Management System ("WMS"), Labor Management System ("LMS"), Warehouse Control System ("WCS"), and/or any other system that may provide data associated with the status of a distribution center in which the material handling system may operate. Material handling system state inputs from the external system may include labor inputs, such as requirements for work assigned, workers assigned and the locations of those workers, predictions of workers assigned, etc., current work inputs, estimated completion times, such as completion times of tasks and/or waves, and/or inputs indicative of characteristics of work, such as types of items (e.g., tote, carton, etc.) and sizes of items. In various embodiments, the speed of a conveyor may be controlled to control (e.g., to reduce) energy consumption by the conveyor and/or the overall material handling system. For example, during peak electric pricing periods (e.g., heavy demand periods such as mid-afternoon in large metropolitan areas) a conveyor may be slowed to reduce its use of electricity and during off-peak electric pricing periods (e.g., low demand periods such as late at night) the conveyor may be run at higher speeds. In this manner, the cost to operate the material handling system may be controlled by using more electricity when electricity is available at a lower cost.

In various embodiments, a run rate of a sortation system or conveyor may be periodically changed in relation to its usage. In additional embodiments, adjustment or changes in induction may also be triggered by conditions upstream or downstream of the sortation system or conveyor. In an embodiment, a sortation system or conveyor may be operated at a first run rate, a maximum throughput value of the sortation system at the first run rate may be determined, an actual throughput value of the sortation system may be monitored, a ratio of the actual throughput value to the maximum throughput value may be compared with a first threshold, and the sortation system or conveyor may be operated at a second run rate in response to the ratio being outside of the first threshold. The various embodiments may provide sortation controllers that perform multi-speed sorter operation that dynamically adjusts based upon how much of the throughput available at a current run rate may be being used. In exemplary versions, the sorter operations may also be adjusted based upon an ability of downstream destinations (e.g., aftersort lanes) to accept items from the sorter. This ability, for example, may be detected directly from enabled aftersort lanes or indirectly based upon a state of fullness of a recirculation lane. Additionally, the labor levels (e.g., staffing levels) of downstream destinations may be used to adjust the sorter operations. In one or more embodiments, the run rate of the sorter may be adjusted periodically so as to not present a distracting visual and audible change. By adjusting the run rate of the sorter to keep within an efficient range, the material handling system may reduce energy consumption, noise, and mechanical wear when appropriate without degrading overall performance of the material handling system.

The systems, methods, devices, and non-transitory processor readable media of the various embodiments enable intelligent speed control of a singulator in a material handling system. In an embodiment, the speed of a singulator may be controlled (e.g., increased, decreased, and/or maintained) based on a detection of one or more items on one or more upstream conveyors, such as collector conveyors, feeding the singulator. In an embodiment, one or more sensor, such as a photoelectric sensor (e.g., "photoeye"), may monitor items flowing onto the one or more upstream conveyors that input items to the singulator. Determinations about the loading of the one or more upstream conveyors may be made based at least in part on detecting one or more items with the one or more sensors as the one or more items flow onto the one or more upstream conveyors that input items to the singulator. For example, the loading level of a belt segment of a collector conveyor may be estimated based on item detection indications received from a photoeye monitoring that collector conveyor. By position tracking the collection of items on the one or more upstream conveyors that input items to the singulator, determinations about the amount of items on the conveyors (e.g., how heavily loaded) and/or volume of flow of items (e.g., how many items per period of time) from the conveyors may be made as the one or more items (or just before the one or more items) arrive on the singulator. Intelligent decisions or determinations about whether to speed up, slow down, or maintain the speed of the singulator may be made based on the determined amount of items on the conveyors and/or volume of flow of items from the conveyors. As an example, based on determining that the volume of flow from one or more collector conveyors feeding the singulator is above a threshold volume level, the singulator's speed may be increased to singulate a higher volume of items and output a higher singulated volume of items (e.g., a higher pace of items) to a downstream sortation system or conveyor, such as a sliding shoe sorter.

In an additional embodiment, the speed of a singulator may be controlled (e.g., increased, decreased, and/or maintained) based on a flow state of items downstream of the singulator. As an example, the speed of a sliding shoe sorter downstream of the singulator and/or the loading level of a sliding shoe sorter downstream of the singulator may be a flow state that is monitored and when the flow state is at or below a threshold (e.g., the sliding shoe sorter's loading level is "low"), the singulator may be slowed down. Additionally, the sliding shoe sorter may be slowed down as well. In an embodiment, the sensor data from the sensors monitoring the upstream input conveyors to the singulator may continue to be monitored, and only when the amount of items or volume of flow for the conveyors is at or below the speed up threshold may the downstream flow state be checked. In this manner, the singulator may not be slowed down until anticipated high amounts or high flow volume of items are cleared through the singulator. In a further embodiment, the speed of a singulator may be controlled based on various external inputs, such as a labor level downstream of the singulator.

For clarity, examples described herein are directed to linear shoe sorters as representing sortation systems that can operate at relatively high run rates as compared to certain other sortation systems. However, aspects consistent with the present disclosure have application to other types of sortation systems.

Abbreviations and definitions used in the present disclosure may include the following:

Linear Run Rate ("LRR") may be a rate, in feet per minute, that the sorter may be running at.

Design Rate ("DR") may be a peak or maximum number of cartons per unit of time (e.g., per minute) that the sorter is expected to move at a given LRR. DR may vary based on the attributes of items flowing through the system (e.g., actual average length of cartons, size and/or shape variations among items, gap size, etc.) and/or the system itself (e.g., current upstream induction capacity, etc.). DR may reflect an ideal operating state of the sorter assuming upstream induction systems are delivering items to the sorter at maximum capacity. For example, if a sorter is running at a LRR of 650 ft/min with a gap of 15" and an average carton length of 27" the design rate would be 185 cartons per minute (cpm).

Effective rate ("ER") may be a peak or maximum amount of actual carton footage, excluding air, per unit of time (e.g., per minute) that the sorter may be expected to move at a given LLR. ER may be closely linked to DR and vary based on the same attributes of items flowing through the system and/or the system itself as discussed above, and/or ER may be determined based on the DR at a given LRR. ER may reflect an ideal operating state of the sorter assuming upstream induction systems are delivering items to the sorter at maximum capacity. For example, using the same values for DR above, the effective rate of the sorter would be 418 carton feet per minute (cfm).

Utilization may be a percentage of the ER that is being utilized at a given LRR over a time period, such as ten minutes. For example, using the values given above, a utilization of 80% would indicate that the sorter is currently delivering 334 cfm out of a possible maximum of 418 cfm.

In an illustrative implementation, certain variables may be used based upon use of a 10 minute timer. This timer operates continuously on a "wall-clock" time basis and may be reset whenever the ten minute interval is up or whenever the sorters LRR may be changed. Examples of use of this 10 minute timer may be as follows:

Ten Minute Utilization ("TMU") may be a variable for keeping track of carton footage placed on the sorter in a ten minute interval.

Ten Minute Recirculation Rate ("TMRR") may be a variable for keeping track of the carton footage placed on the recirculation lane in a ten minute interval. Items may end up on the recirculation lane due to a bad scan of an identification label (e.g., barcode), failure to determine a destination lane, a full destination lane that is unable to accept the item, or an overrun of a destination lane, etc.

Certain other variables may be used based upon a 1 minute timer, which may be used once the sorter is up to speed and product is being inducted onto the sorter. Examples of use of this 1 minute timer are as follows:

One Minute Recirculation Rate ("OMRR") may be a variable for holding carton footage that ends upon the circulation lane during a one minute interval. If this value is greater than or equal to 85% of the recirculation lane run rate, for example, the sorter may be forced to slow down two speed steps (or one, or possibly none if operating at the lowest LRR). This feature may be directed to situations where there is an issue with getting destination lane status during a scan (bad scanner, host communication, etc.).

Recirculation Lane Status ("RLS") may be used to throttle back or stop the sorter depending on how full the recirculation lane is. As used herein, RLS may mean a level of fullness on a recirculation lane. An example of setting thresholds for RLS may be as follows: considered critical when it is such that it will likely not be able to take any more product onto the line (i.e., when full or close to being full); and considered at a warning level when it is 50% full. Based on the RLS, the sorter may respond by slowing down to the next slowest speed option. When already operating at the lowest speed the sorter may continue to operate at that level until critical.

Gap Size may refer to linear spacing between cartons on the sorter. For example, gap size may be a system variable set during commissioning of the sorter and further can be adjusted during operation. Changing this value may simply change the ER value. When the TMU is calculated, the system may respond appropriately.

It should be appreciated with benefit of the present disclosure that various embodiments may also dynamically adjust gap size in order to induct at a current run rate of the sorter an appropriate number of items that may be handled by destinations downstream of the sorter. For example, the run rate may be adjusted over longer intervals than how often gap size may be adjusted. The changes in the run rate may achieve energy efficiencies when available and the more responsive changes in throughput via gap size may address short duration congestion or downstream demand.

In an embodiment, sorter speed options may be five in number with the highest option being the highest rate at which the sorter may operate reliably. A bottom end option can be 450 ft/min with the remaining three options spread evenly there between. For example, the number of predetermined options may be set such that an ER operating range may be maintained. In the exemplary implementation, a current sorter speed option may be maintained so long as the sorter may be maintaining between 60% to 80% of ER at the current LRR. When above the upper threshold or "speed up threshold" (e.g., 80%), then the next faster speed option may be predicted to restore operation to within this range. When the sorter may be below the lower threshold or "slow down threshold" (e.g., 60%), then the next lower sorter speed option may be predicted to return operation to with this range. In various embodiments, the change in sorter speed may be more than one speed option or be proportional to an amount outside of this range in order to correct for large deviations.

In an embodiment, an ER operating range may be selected. In an embodiment, it may be critical for this algorithm that when a sorter is running at the speed up point of 80% of ER at the current given LRR that the next step up in LRR may result in the current TMU falling above 60% of the new ER (i.e., the slow-down threshold).

For example in TABLE 1, the five LRR sorter speed options are 450, 500, 550, 600 and 650 ft/min. Defaults used in TABLE 1 include 27" carton size, a 15" gap size, a fixed recirculation line rate of 150 ft/min:

TABLE 1

|     |     |     | Percentage of ER |      |      |      |      |      |      |      |      |     |
| --- | --- | --- | ---- | ---- | ---- | ---- | ---- | ---- | ---- | ---- | ---- | --- |
| LRR | DR  | ER  | 100% | 90%  | 80%  | 70%  | 60%  | 50%  | 40%  | 30%  | 20%  | 10% |
| 450 | 129 | 289 | 289  | 260  | 231  | 203  | 174  | 145  | 116  | 87   | 58   | 29  |
| 500 | 143 | 321 | 321  | 289  | 257  | 225  | 193  | 161  | 129  | 96   | 64   | 32  |
| 550 | 157 | 354 | 354  | 318  | 283  | 248  | 212  | 177  | 141  | 106  | 71   | 35  |
| 600 | 171 | 386 | 386  | 347  | 309  | 270  | 231  | 193  | 154  | 116  | 77   | 39  |
| 650 | 186 | 418 | 418  | 376  | 334  | 293  | 251  | 209  | 167  | 125  | 84   | 42  |
|     |     |     |      | Increase LRR |  |   | Same |      |      | Decrease LRR | | |

In one embodiment, system startup may involve the following:

A) If recirculation lane status is at warning or critical level use the lowest available LRR and start operation.

B) If accumulation status is less than or equal to 25%, start sorter at lowest available LRR and start operation. As used herein, accumulation status may mean a level of fullness on one or more pre-merge lanes in a non-singulator system.

C) If accumulation status is at 50% by less than 75%, start sorter at middle available LRR and start operation.

D) If accumulation status is at 75%, start sorter at highest available LRR and start operation.

When the sorter indicates readiness to receive product and at what rate, the merge subsystem may respond with supplied product.

The sorter may stop when the merge subsystem does not have any product to supply to the sorter, when a jam is detected, or when an emergency stop ("E-Stop") control may be activated. When responding to the detected jam or E-stop, the sorter can be stopped and not diverting any product and then waiting for the condition to be cleared. When restarted, the sorter may push the current product on the sorter off to the recirculation lane at the lowest available LRR (at or below the recirculation lane run rate if possible). The sorter may be set to the lowest available LRR, the TMU and OMRR may be reset, and operation may continue. Upon system shutdown or request by operator to stop, the sorter may clear the current product by either being diverted or to recirculation lane. The sorter may also operate in blow-through mode.

FIG. 1 illustrates a material handling system 100 including an optional singulator system 102, a presort system 110, an input conveyor system 106, a sortation system 104, and an aftersort system 108 in communication with a computing device 116. The presort system 110 may be comprised of various equipment such as receiving conveyors, automatic storage and retrieval systems (ASRS), manufacturing systems, etc., that input items to the input conveyor system 106. The presort system 110 may include various sensors 101, such as photoelectric sensors, motor speed sensors, etc., that may output information about the items in the presort system 110 and/or the equipment comprising the presort system 110 to the computing device 116. The input conveyor system 106 may be comprised of one or more conveyors, such as collection conveyors, that may receive the items from the presort system 110 and input the items to the singulator system 102. The input conveyor system 106 may include various sensors 103, such as photoelectric sensors, motor speed sensors, etc., that may output information about the items in the input conveyor system 106 and/or the equipment comprising the input conveyor system 106 to the computing device 116. The singulator system 102 may be comprised of one or more conveyor, such as one or more wide bulk conveyor, and one or more recirculation conveyor, and may accept an unregulated flow of items from the input conveyor system 106 and discharge the items as a single file stream to the sortation system 104. The singulator system 102 may include various optional sensors 105, such as photoelectric sensors, motor speed sensors, etc., that may output information about the items in the singulator system 102 and/or the equipment comprising the singulator system 102 to the computing device 116. In various embodiments, the singulator system 102 may be optional. The singulator system 102 may be optional because in regulated flow systems, such as system 200B described below with reference to FIG. 2B, the discharge from the input conveyor system 106 may already be in a single file stream, thereby reducing or eliminating a need for a singulator. The sortation system 104 may be comprised of one or more sorters, such as one or more linear shoe sorters, that may convey the items received in the single file stream from the singulator system 102 and divert single items and/or groups of items to conveyors or other equipment to move the items to destinations in the aftersort system 108. For example, the sortation system 104 may be a linear shoe sorter and the run rate may be a linear run rate ("LRR"). The sortation system 104 may include various sensors 107, such as photoelectric sensors, motor speed sensors, etc., that may output information about the items in the sortation system 104 and/or the equipment comprising the sortation system 104 to the computing device 116. The aftersort system 108 may be comprised of various equipment and/or stations to handle the items received from the sortation system 104, such as packing stations, shipping docks, ASRS, etc. The aftersort system 108 may include various sensors 109, such as photoelectric sensors, motor speed sensors, etc., that may output information about the items in the aftersort system 108 and/or the equipment comprising the aftersort system 108 to the computing device 116. In an embodiment, the singulator system 102, the presort system 110, the input conveyor system 106, the sortation system 104, and/or the aftersort system 108 may communicate with one or more communications module 122 of the computing device 116 directly via one or more external communications bus 136. Additionally or alternatively, the presort system 110, the input conveyor system 106, the sortation system 104, and/or the aftersort system 108 may communicate with the computing device 116 via a WMS and/or the WMS can provide information about the presort system 110, the input conveyor system 106, the sortation system 104, and/or the aftersort system 108 to the computing device 116. Additionally, a WMS or other external system (e.g., LMS, WCS, etc.), may provide material handling system state inputs, such labor inputs (e.g., labor or staffing levels at upstream and/or downstream stations, worker requirements for work assigned, predictions of workers assigned etc.), current work inputs, estimated completion times (e.g., estimated completion times for tasks or waves), work characteristics (e.g., types of items, number of items, etc.), and electric pricing period (e.g., heavy demand period, low demand period, etc.), etc., to the computing device 116.

In an embodiment, the computing device 116 may include at least one processor 118, data store 124, memory, and user interface 126 communicating with each other via an internal communication bus 119. The processor 118 may be configured with processor executable instructions to perform operations described herein, for example to execute a conveyor controller module 128 including at least a singulator controller module 129 and sorter controller module 130. The singulator controller module 129 may be executed by the processor 118 to control the operations of the singulator system 102 (e.g., speeding up, slowing down, and/or maintaining the speed of the singulator). The sorter controller module 130 may be executed by the processor 118 to control the operations of the sortation system 104 (e.g., speeding up, slowing down, and/or maintaining the speed of the singulator). Additionally, the conveyor controller module 128 may include other modules that may be executed by the processor 118 to control the operations of the presort system 110, input conveyor system 106, and/or aftersort system 108. In this manner, by executing the various modules of the conveyor controller module 128, the computing device 116 may control the operations of the material handling system 100. In an embodiment, the various sensors 101, 103, 105, 107, and 109 may output sensor information to the processor 118 and the sensor data may be used by the processor in executing the various modules of the conveyor controller module 128 to make determinations to guide the operations of the material handling system 100, such as the speeds of the singulator system 102, the presort system 110, the input conveyor system 106, the sortation system 104, and/or the aftersort system 108. Additionally, the material handling system state inputs provided to the computing device 116 by a WMS or other external system (e.g., LMS, WCS, etc.) may be used by the conveyor controller module 128, for example by the singulator controller module 129 and/or the sorter controller module 130, to make determinations to guide the operations of the material handling system 100, such as the speeds of the singulator system 102, the presort system 110, the input conveyor system 106, the sortation system 104, and/or the aftersort system 108.

In an embodiment, the sorter controller module 130 may operate the sortation system 104 at a first run rate. For example, the first run rate may be one of "x" discrete linear run rates ("$LRR_{1-x}$") as depicted at 115. The sorter controller module 130 may determine a maximum throughput value of the sortation system 104 at the first run rate. The sorter controller module 130 may monitor an actual throughput value, which may be retained in a throughput register 113 of the sortation system 104 for a period of time tracked by a timer 111. The sorter controller module 130 may compare a ratio of the actual throughput value to the maximum throughput value with a first threshold, for example an upper threshold 112. The sorter controller module 130 may operate the sortation system 104 at a second run rate in response to the ratio being outside of the first threshold (e.g., upper threshold 112), such as being greater than or above the upper threshold 112. Alternatively or in addition, the sorter controller module 130 may operate the sortation system 104 at a third run rate in response to the ratio being outside of a second threshold, for example being less than or below a lower threshold 114.

Processor 118 may include a single or multiple set of processors or multi-core processors. Moreover, processor 118 may be implemented as an integrated processing system and/or a distributed processing system. Memory 120 may include any type of memory usable by a computer, such as random access memory (RAM), read only memory (ROM), tapes, magnetic discs, optical discs, volatile memory, non-volatile memory, and any combination thereof. Additionally, a data store device 124, may be any suitable combination of hardware and/or software, that provides for mass storage of information, databases, and programs employed in connection with aspects described herein. For example, data store device 124 may be a data repository for applications not currently being executed by processor 118. The user interface component 126 may be operable to receive inputs from a user of computing device 116, and further operable to generate outputs for presentation to the user. User interface component 126 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 126 may include one or more output devices, including but not limited to a display, a speaker, a haptic feedback mechanism, a printer, any other mechanism capable of presenting an output to a user, or any combination thereof.

Figure 2A:
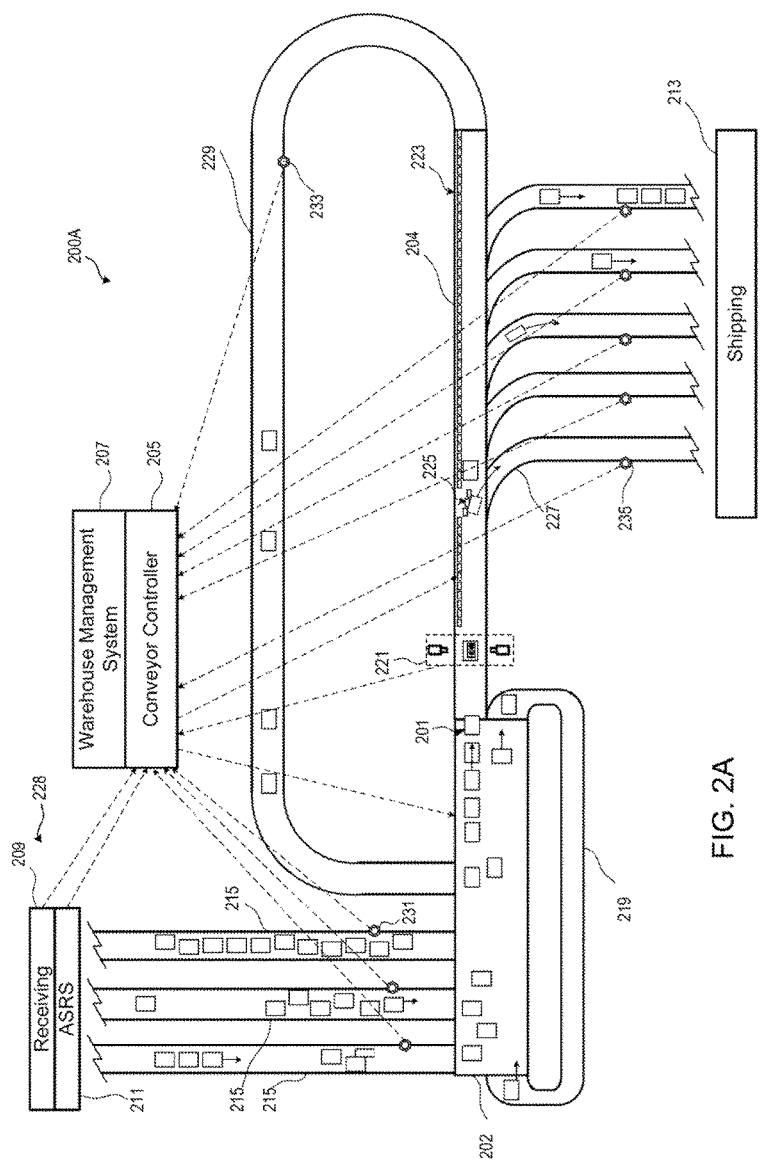
FIGS. 2A and 2B are top view diagrams of material handling systems with a functional schematic of a conveyor controller according to various embodiments.
Figure 2B:
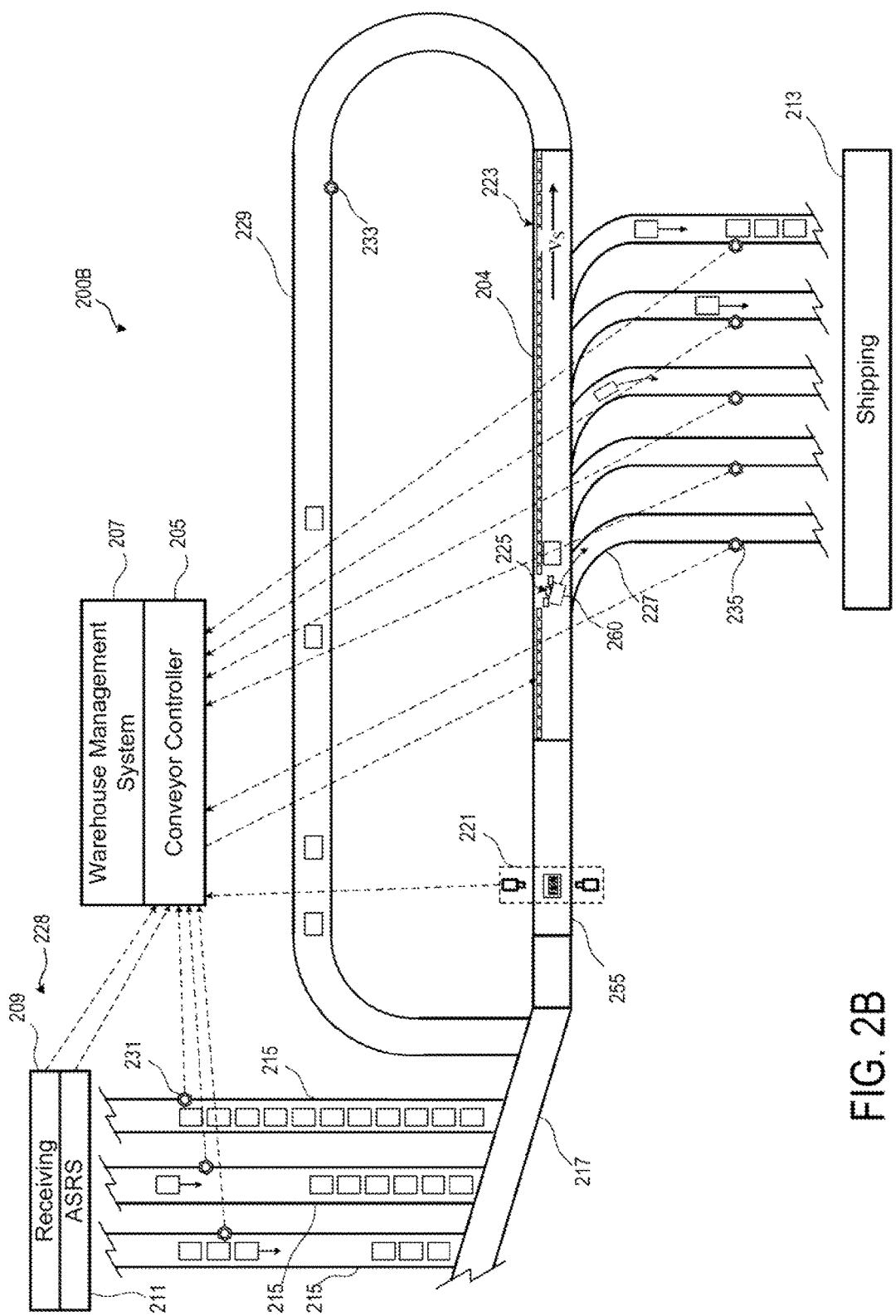

FIGS. 2A and 2B are top view diagrams of material handling systems 200A and 200B, respectively, with a functional schematic of a conveyor controller 205 according to various embodiments. FIG. 2A illustrates material handling system 200A which may include a singulator 202, while FIG. 2B illustrates an alternative material handling system 200B is similar to material handling system 200A, but which may not include a singulator.

Referring to FIG. 2A, material handling system 200A is illustrated including a singulator 202 that may receive an unregulated and/or overlapping flow of items from input conveyors 215 and output a single file stream of items 201 to a sortation system 204, such as a sortation system including a linear sliding shoe sorter 223. The input conveyors 215, such as collector conveyors, may receive items from presort systems 228 and sort these items under overall control by a warehouse management system ("WMS") 207. For example, the WMS 207 can track items that arrive in a receiving area 209 and/or that are buffered in an Automated Storage and Retrieval System ("ASRS") 211. Additionally, the WMS 207 can track items that arrive in the shipping area 213 for shipment out of the material handling system 200A. The WMS 207 may also track additional information, such as labor levels, current work levels, estimated completion times, and work characteristics to generate material handling system state inputs. For example, the WMS 207 may identify work assigned in the material handling system 200A and whether or not requirements for that work are met or not. As an additional example, the WMS 207 may identify labor (or staffing) levels at stations associated with the material handling system 200A, such as the number of workers assigned to sort lines at the shipping area 213. Further, the WMS 207 may predict the labor (or staffing) level at a station associated with the material handling system 200A at a given time, such as the number of assigned workers, by accounting for various factors that impact labor levels, such as the current season (e.g., holiday staffing levels, summer staffing levels, etc.), work schedule (e.g., breaks, shift changes, etc.), and/or worker assignment changes. As another example, the WMS 207 may track information about the work being performed by the material handling system 200A, such as current work assigned (e.g., orders to fill), estimated completion time of tasks or waves being processed, the characteristics of the work being performed (e.g., type of cartons or items being moved and size of those items or cartons), etc. In this manner, by tracking the additional information, such as labor levels, current work levels, estimated completion times, and work characteristics, the WMS 207 may generate material handling system state inputs and provide the inputs to the conveyor controller 205 enabling the conveyor controller to control various conveyor operations, such as conveyor speeds, in the material handling system 200A based at least in part on the inputs from the WMS 207. While illustrated and described as a WMS 207, WMS 207 is merely on example of an external system that may provide inputs to the conveyor controller 205, and other external systems, singularly or in combinations, such as an LMS, WCS, etc., may provide inputs to the conveyor controller 205.

Items are directed to input conveyors 215 for release onto the singulator 202, which in turn singulates the items into a single file stream of items 201 output onto the sorter 204. Items on the singulator which are not successfully singulated into the single file stream 201 may be re-circulated back to the start of the singulator via the recirculation conveyor 219. An initial portion of the sorter 204 may be an induct conveyor operating to identify each item in the single file stream of items 201 by a scanner 221. The items then pass over a linear shoe sorter 223 of the sortation system 204 for selective diverting by shoes 225 to destinations, depicted as take-away conveyors 227. Those items that are not diverted may be taken by a recirculation conveyor 229 back to the singulator 202.

A conveyor controller 205, such as implemented by the computing device 116 (FIG. 1) may be in communication with the singulator 202 and/or the sortation system 204 to perform singulator and sorter control operations. The conveyor controller 205 may receive inputs, such as from the WMS 207, sensors 231 (e.g., photoeyes, fullness sensors, volume sensors, speed sensors, etc.) on the input conveyors 215, sensor 233 (e.g., photoeyes, fullness sensors, volume sensors, speed sensors, etc.) on the recirculation conveyor 229, and sensors 235 (e.g., photoeyes, fullness sensors, volume sensors, speed sensors, etc.) on the take-away conveyors 227. The conveyor controller 205 may operate the singulator 202 and optionally the sortation system 204 at variable speeds based at least in part on sensor data received from one or more of the sensors 231, 233, 235, speed or other state information received from the input conveyors 215, singulator 202, sortation system 204, and/or take-away conveyors 227, information from the WMS 207, and/or data received from other sources. In this manner, inputs from one or more of the sensors 231, 233, 235, speed or other state information received from the input conveyors 215, singulator 202, sortation system 204, and/or take-away conveyors 227, information (e.g., material handling system state inputs) from the WMS 207 (e.g., labor levels, current work levels, estimated completion times, work characteristics, etc.), and/or data received from other sources may be used by the conveyor controller 205 to determine downstream capacity and adjust the speed of conveyors, such as singulator 202, the sortation system 204, and/or other conveyors.

In an embodiment, the conveyor controller 205 may operate the sortation system 204 or another conveyor, as a specific example the linear shoe sorter 223, at a first run rate, determine a maximum throughput value of the sortation system 204 or another conveyor at the first run rate, monitor an actual throughput value of the sortation system 204 or another conveyor, compare a ratio of the actual throughput value to the maximum throughput value with a first threshold, and operate the sortation system 204 or another conveyor at a second run rate in response to the ratio being outside of the first threshold. The monitoring may maintain the sortation system 204 or another conveyor within a range of effective rates of utilization. To that end, the conveyor controller 205 of the material handling system 200A may further perform operations to operate the sortation system 204 or another conveyor at the second run rate that may be greater than the first run rate in response to the ratio being greater than the first threshold, to compare the ratio with a second threshold that is lower than the first threshold, and to operate the sortation system 204 or another conveyor at a third run rate that is less than the first run rate in response to the ratio being less than the second threshold.

Referring to FIG. 2B, an alternative material handling system 200B is illustrated. Material handling system 200B is similar to material handling system 200A, except that rather than including a singulator 202, in material handling system 200B items 260 may be directed to accumulation lanes 215 for slug or zippered release onto a merge conveyor 217, which in turn carries the items 260 onto an induct conveyor 255 for being identified by scanner 221. Conveyor controller 205 may control the slug or zippered release of items 260 by accumulation lanes 215.

Figure 3:
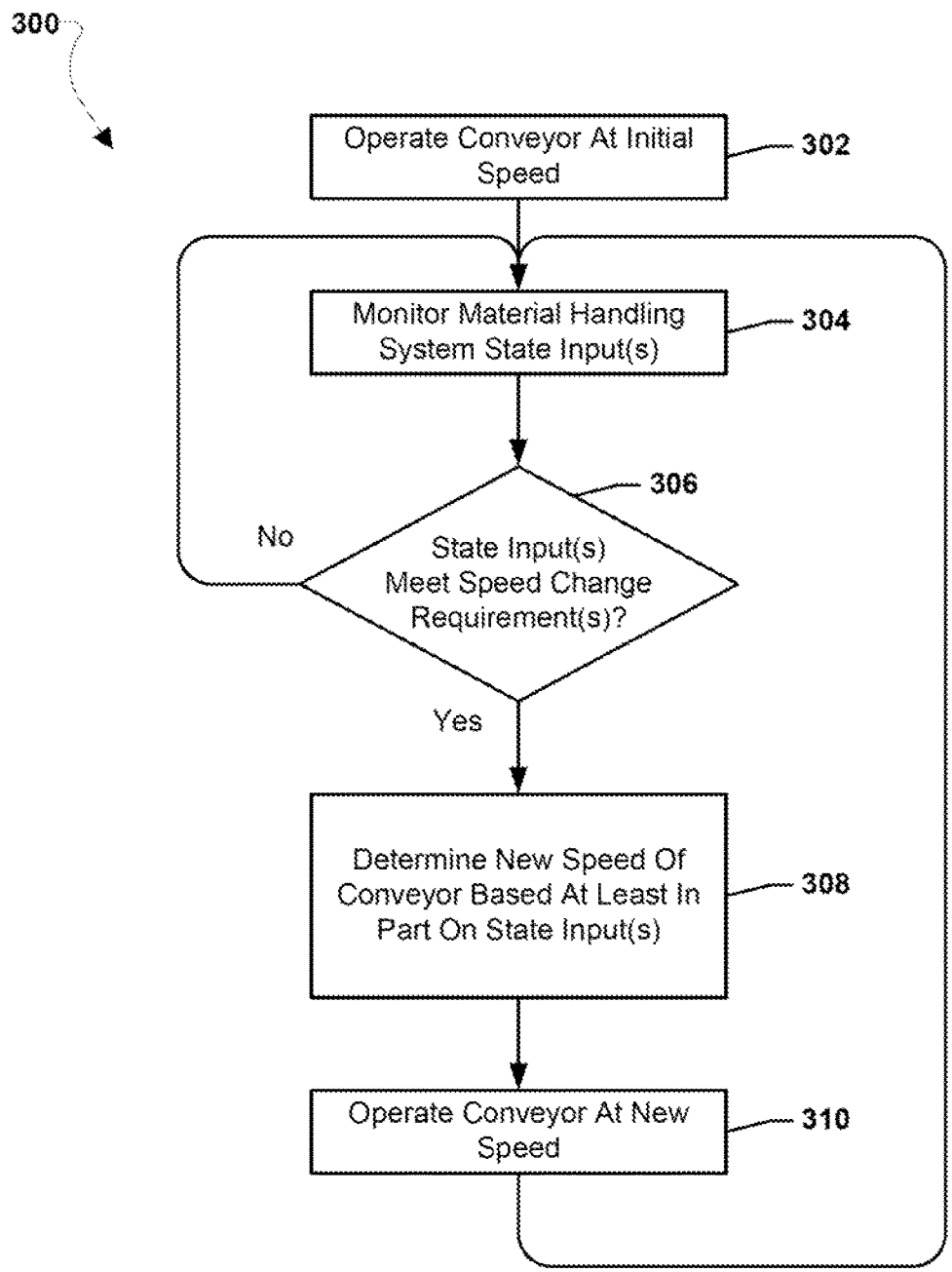
FIG. 3 is a process flow diagram illustrating an embodiment method for controlling the speed of a conveyor.

FIG. 3 is a process flow diagram illustrating an embodiment method 300 for controlling the speed of a conveyor. The operations of method 300 may be used to dynamically control the speed of any conveyor, specific examples of which include singulators, sorters, etc. In an embodiment, the operations of method 300 may be performed by a processor of a conveyor controller configured to control the operations (e.g., speed or run rate) of a conveyor (e.g., a singulator, sorter, etc.) in a material handling system.

In block 302 the processor may operate the conveyor (e.g., a singulator, a sorter, or any other type of variable speed conveyor) at an initial speed (or run rate). In block 304 the processor may monitor one or more material handling system state inputs. Inputs may include any type of data associated with the material handling system, and the processor may monitor the inputs by comparing the received inputs singularly or in various combinations to threshold levels to determine whether the inputs fall below, meet, or exceed those threshold levels. In this manner, the processor may determine state information about the material handling system and items in the material handling system (e.g., upstream and/or downstream capacity) based on the monitored inputs. As examples, material handling system state inputs may be information provided to the processor from the WMS (e.g., labor levels, current work levels, estimated completion times, work characteristics, electrical pricing period indications, etc.), from sensors, (e.g., photoeyes, fullness sensors, volume sensors, speed sensors, etc.) on the input conveyors, recirculation conveyors, and/or take-away conveyors, from the conveyors themselves, and/or from other sources. Material handling system state inputs may be generated by various external systems (e.g., WMS, LMS, WCS, etc.) in various manners, for example by identifying and/or predicting work assigned in the material handling system and whether or not requirements for that work are met or not, by identifying and/or predicting labor (or staffing) levels at stations associated with the material handling system, such as the number of workers assigned to sort lines at the shipping area accounting for various factors that impact labor levels, such as the current season (e.g., holiday staffing levels, summer staffing levels, etc.), work schedule (e.g., breaks, shift changes, etc.), and/or worker assignment changes, by tracking information about the work being performed by the material handling system, such as current work assigned (e.g., orders to fill), estimated completion time of tasks or waves being processed, the characteristics of the work being performed (e.g., type of cartons or items being moved and size of those items or cartons), and/or by determining the current electrical pricing period. These material handling system state inputs may then be used by the processor of a conveyor controller (e.g., a sortation system controller, singulator system controller, etc.) to determine whether the speed (or run rate) of conveyor systems should be changed.

In determination block 306 the processor may determine whether the one or more material handling system state inputs meet speed change (or run rate change) requirements for the conveyor. As an example, speeds (or run rates) may be associated with threshold values of the inputs in a memory available to the processor, such as a data table, and the processor may determine whether the inputs meet, exceed, or fall below the threshold values which may indicate whether one or more speed change requirement for the conveyor may be met. In response to determining one or more speed change (or run rate change) requirement is not met (i.e., determination block 306="No"), the processor may continue to monitor the one or more inputs in block 304. In response to determining the one or more material handling state inputs meet one or more speed (or rate) change requirements (i.e., determination block 306="Yes"), the processor may determine a new speed of the conveyor based at least in part on the inputs. As an example, a data table stored in memory may correlate optimal speeds of the conveyor with one or more various input values, and the processor may select the new speed as the speed correlated with the determined one or more input values. As another example, the processor may select a function for controlling the speed of the conveyor and the determined inputs may be inputs to the function which may output a resulting conveyor speed. In block 310 the processor may operate the conveyor at the new speed (or rate). For example, the processor may send a speed (or rate) setting command to the motor or motors of the conveyor to operate the conveyor at the new speed (or rate). The method 300 may proceed to block 304 to monitor inputs. In this manner, the speed of the conveyors may be continually and dynamically adjusted based at least in part on the state of the material handling system and the items moving through the material handling system.

Figure 4:
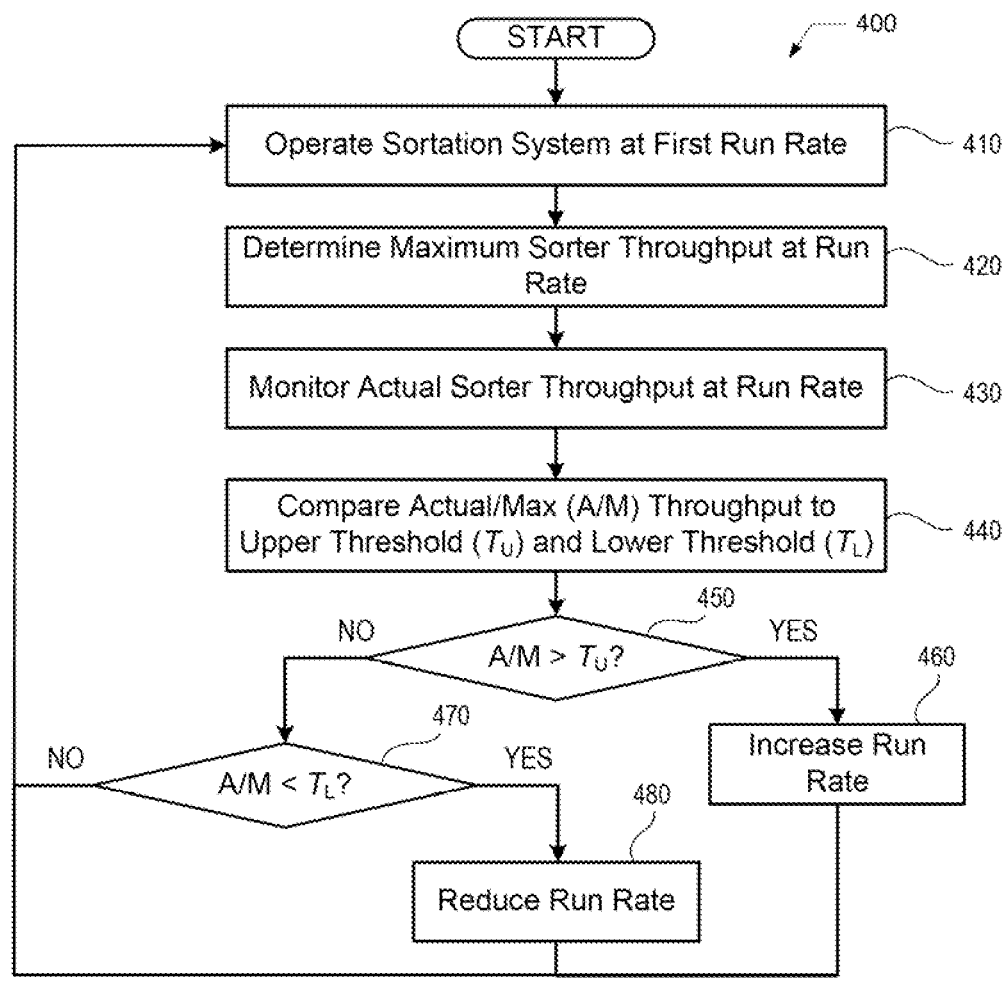
FIG. 4 is a process flow diagram illustrating an embodiment method for controlling a run rate of a sortation system.

In FIG. 4, a method 400 according to one or more aspects of the present disclosure depicts controlling sortation of items by a material handling system. In an embodiment, the operations of method 400 may be performed by a processor of a conveyor controller configured to control the operations (e.g., speed or run rate) of a sortation system in a material handling system. In an embodiment, the controller may perform one or more operations of method 400 to determine whether one or more material handling system state inputs meet speed change (or run rate change) requirements for the sortation system and determine a new speed (or run rate) for the sortation system. The controller may operate a sortation system at a first run rate (or speed) (block 410). The controller may determine a maximum throughput value of the sortation system at the first run rate (block 420). For example, the throughput value could be incorporated into a lookup table. Alternatively, the controller may calculate the value. The controller may monitor an actual throughput value of the sortation system (block 430). The controller compares a ratio of the actual throughput value to the maximum throughput value with a first threshold (block 440). A determination is made as to whether the ratio outside of a first threshold. For example, the first threshold can be an upper threshold ($T_U$) such that being outside refers to being greater than the upper threshold (block 450). If greater in block 450, then the controller may operate the sortation system at a second run rate in response to the ratio being outside of the first threshold. For the example given, the controller increases the run rate (or speed) (block 460). If not greater in block 450, then a further determination may be made as to whether the ratio is less than a second threshold, in particular a lower threshold ($T_L$) (block 470). If so, then the controller may operate the sortation system at a third run rate (or speed) that is less than the first run rate (or speed) in response to the ratio being less than the second threshold (block 480). Otherwise, the current run rate (or speed) may be within a range between the upper and lower threshold. Thus, the controller may maintain the current run rate (or speed) by returning processing to block 410 for continued monitoring.

In an exemplary aspect, changes in the run rate (or speed) may be made after monitoring the throughput rate for a period of time so that the sortation system may not be frequently changing rate in a distracting manner. For example, the period of time can be a time period greater than one minute. As another example, the time period can be ten minutes or greater.

In one or more embodiment, the method 400 may also include monitoring a value representing the unavailability of aftersort destinations of the sortation system and reducing a run rate of the sortation system in response to the unavailability value exceeding a first recirculation threshold.

In various embodiments, the method 400 may also include monitoring a value representing the unavailability of aftersort destinations of the sortation system, and reducing inductions to the sortation system in response to the unavailability value exceeding a second recirculation threshold.

In various embodiments, the method 400 may also include determining that an accumulated quantity on an accumulation lane that inducts to the sortation system exceeds a fullness threshold, and operating the sortation system at an increased run rate in response to the accumulated quantity exceeding the fullness threshold. In a particular aspect, the method 400 may further include receiving an alert of an impending increase in quantity of inventory to be conveyed to the accumulation lane, and operating the sortation system at an increased run rate (or speed) in response to the alert.

In various embodiments, the method 400 may also include monitoring a usage level of a recirculation conveyor, determining that the usage level exceeds a threshold, operating the sortation system at a reduced throughput rate in response to the usage level exceeding the threshold. In a particular aspect, the method 400 may further include monitoring the usage level by monitoring a current fullness level of the recirculation conveyor. Alternatively, monitoring the usage level can be by determining a projected fullness level of the recirculation conveyor based upon a quantity of inducted objects destined for the recirculation conveyor. In an exemplary aspect, operating the sortation system at a reduced throughput rate may be by stopping induction of items on the sortation system, and operating the sortation system at a reduced run rate of the recirculation conveyor.

Figure 5A:
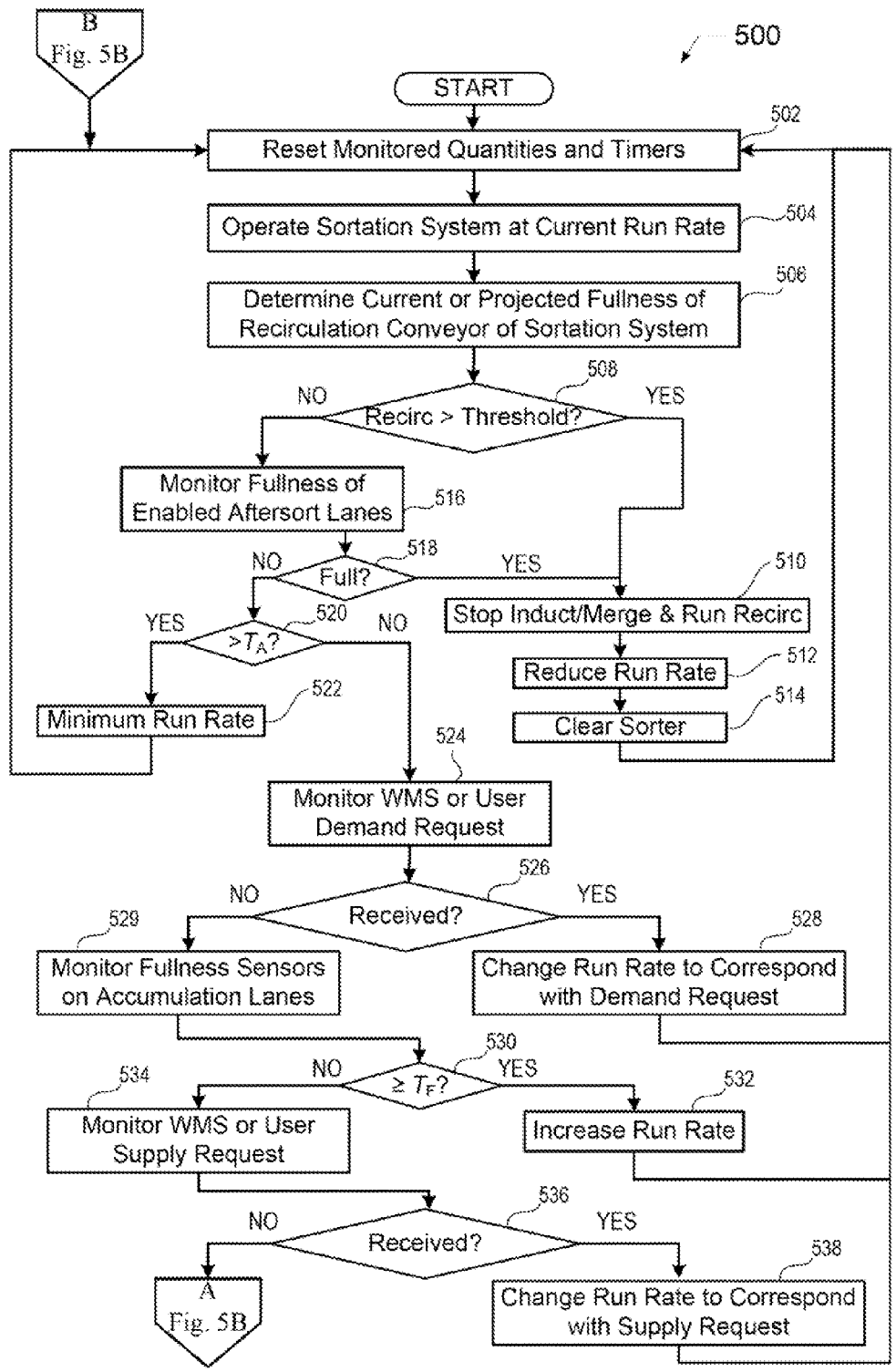
FIGS. 5A and 5B are process flow diagrams illustrating an embodiment method for controlling a sortation system.
Figure 5B:
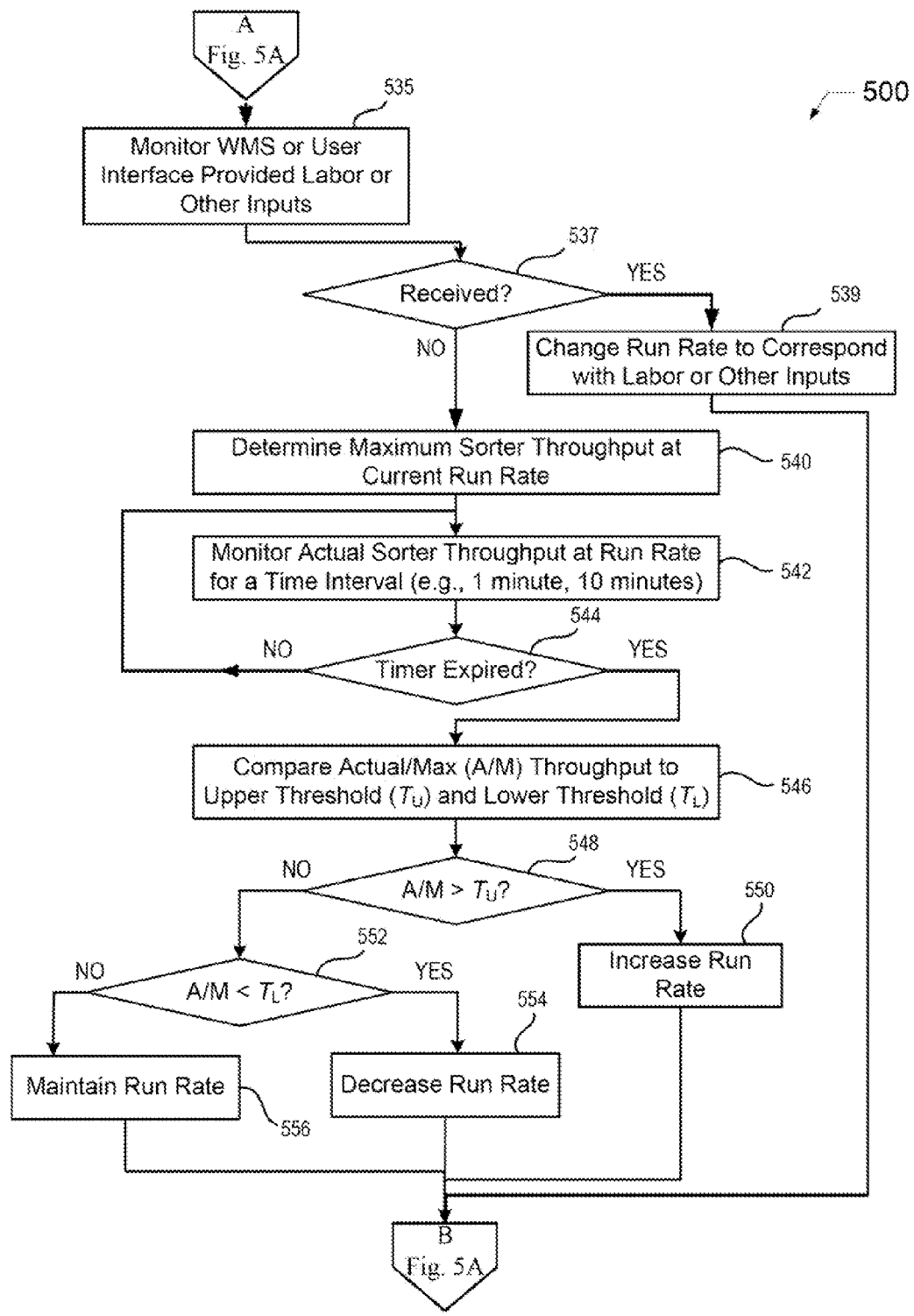

In FIGS. 5A-5B, a method 500 for controlling a sortation system of a material handling system is depicted. In an embodiment, the operations of method 500 may be performed by a processor of a conveyor controller configured to control the operations (e.g., speed or run rate) of a sortation system in a material handling system. It should be appreciated that certain threshold numbers or durations or run rates described herein are illustrative and that optimizations may be made for particular configurations and requirements for a material handling system. It should also be appreciated that implementations consistent with aspects of the present disclosure may include some subset of features and that the operations of method 500 are illustrative and not all inclusive. In an embodiment, the controller may perform one or more operations of method 500 to determine whether one or more material handling system state inputs meet speed change (or run rate change) requirements for the sortation system and determine a new speed (or run rate) for the sortation system. With initial reference to FIG. 5A, the method 500 may begin with an initialization procedure performed by the controller, such as by resetting monitored quantities and timers (block 502) In the exemplary version, a Ten Minute Utilization (TMU) value and Ten Minute Recirculation Rate (TMRR) value are maintained and a ten minute timer and a one minute timer are started. A sortation controller may operate the sortation system at a current run rate (or speed) (block 504). For example, a linear run rate for a linear shoe sorter may be selected based upon a default value (e.g., full rate), based upon a quantity of items already accumulated.

Recirculation of the sortation system may be one factor addressed by the controller determining current or projected fullness of the recirculation lane or conveyor of the sortation system (block 506). The TMRR value may represent a dynamic running total of carton footage that is currently on the sorter that is known to be destined for the recirculation lane. This determination may be known at the time of induction in that a destination may not be available or may be known subsequently when a failure to divert is detected. A determination may be made by the controller as to whether the fullness of the recirculation lane exceeds a threshold (block 508). For example, the threshold could be based upon a prediction of overrunning the recirculation lane or for the recirculation lane already being 75% full. If the threshold is met or exceeded in block 508, then all merge lanes may be disabled by the controller except for a recirculation lane (block 510). Alternatively, the sortation controller may stop inducting items onto the sorter. The run rate (or speed) may be reduced by the controller (block 512). For example, if possible, the controller slows the sorter to match the rate of the recirculation lane. The controller may continue to clear product off of the sorter (block 514). Processing may then return to block 502 to begin the cycle again. In an exemplary embodiment, the controller performing operations of method 500 may wait for the cause of the stop to be cleared. The current run rate (or speed) (e.g., the linear run rate) may be set to the lowest LRR option, which may be the recirculation rate (or speed).

If the determination in block 508 is that the fullness of the recirculation lane does not exceed the threshold, then the fullness of the enabled aftersort lanes may be monitored by the controller (block 516). Then a determination may be made by the controller as to whether all enabled after sort lanes are full (block 518). If full in block 518, then processing proceeds to blocks 510-514 to stop inducting, to reduce the run rate, and to clear the sorter as described above. If recirculation space is not available to clear the sorter, then the sorter can be stopped. If not full in block 518, then a further determination may be made by the controller as to whether an aftersort threshold ($T_A$) of the enabled aftersort lanes is exceeded (block 520). For example, $T_A$ may be 50%. If exceed in block 520, then the run rate may be set to a minimum or lowest run rate (or speed) by the controller (block 522) and the cycle may return to block 502.

The sortation controller may be responsive to demand requests that are external to the subsystems directly monitored by the sortation controller. For example, the sortation controller may monitor for any demand request from a WMS (or other system, such as LMS, WCS, etc.), a user interface, and/or another controller (block 524). For example, a demand request may be an indication of down stream capacity available on a conveyor downstream of the sortation system. A determination may be made by the controller in block 526 as to whether such a demand has been received. If so, the run rate (or speed) may be changed to correspond to the demand request (block 528). The cycle can return to block 502.

If a demand is not received, the sortation controller may be responsive to an apparent demand that is sensed based upon a state of the accumulation lanes. To that end, the sortation controller may receive inputs from fullness sensors on the accumulation lanes (block 529). For example, photo eyes that remained block at point on each accumulator lane can indicate 100% full, 75% full, 50% full, etc. A determination may be made by the controller as to whether a fullness threshold ($T_F$) has been met or exceeded (block 530). In response to the trigger of the $T_F$ being met or exceeded, the run rate (or speed) may be increased by the controller (block 532) and processing may return to block 502 for another control cycle. For example, if the sum of all merge lane fullness is above the fullness threshold ($T_F$), such as 50%, then the controller may set the run rate to full speed.

The sortation controller may be responsive to supply requests that are external to the subsystems directly monitored by the sortation controller. For example, the sortation controller may monitor for any supply request from a WMS, a user interface, and/or another controller (block 534). For example, a supply request may be an indication of upstream items that are ready to be released toward the sortation system, such as by an accumulation system. A determination may be made by the controller in block 536 as to whether such a supply request has been received. If so, the run rate (or speed) may be changed by the controller to correspond to the supply request (block 538) and the cycle may return to block 502.

Continuing in FIG. 5B, when no supply request prompts the sortation controller to change sorter operation, the controller may monitor for state inputs that are external to the subsystems directly monitored by the sortation controller. For example, the sortation controller may monitor for WMS (or other system, such as LMS, WCS, etc.) or user interface provided labor or other material handling system state inputs. Material handling system state inputs from the external systems may include labor inputs, such as requirements for work assigned, workers assigned and the locations of those workers, predictions of workers assigned, etc., current work inputs, estimated completion times, such as completion times of tasks and/or waves, and/or inputs indicative of characteristics of work, such as types of items (e.g., tote, carton, etc.) and sizes of items. Other inputs from external systems may include power pricing inputs (e.g., peak or off peak operating state information). A determination may be made by the controller in block 537 as to whether such labor or other inputs have been received. If so, the run rate (or speed) may be changed to correspond to the labor or other inputs (block 539). The cycle can then return to block 502 of FIG. 5A.

When labor or other inputs are received by the sortation controller to change sorter operation, the sortation controller may adjust the run rate (or speed) of the sorter to maintain within a range of effective rates. The sortation controller may determine a maximum sorter throughput at the current run rate (block 540). The sortation controller may monitor actual sorter throughput at the current run rate (block 542). A determination may be made by the controller as to whether the applicable timer has expired (e.g., 1 minute, 10 minute, etc.) (block 544). If not expired, then the controller may continue to monitor in block 542. If expired in block 544, a comparison may be made by the controller between the ratio of the actual throughput to the determined maximum throughput (Actual/Max (A/M)) at the current run rate to an upper threshold and a lower threshold (block 546). If the controller determines the A/M is greater than the upper threshold in block 548, then the run rate (or speed) may be increased by the controller (block 550). If the controller determines the A/M is less than the lower threshold in block 552, then the run rate (or speed) may be decreased by the controller (block 554). If A/M is not greater than the upper threshold in block 548 nor below the lower threshold in block 552, then the run rate (or speed) may be maintained by the controller (block 556). Upon performing operations of blocks 550, 554, or 556, the controller may return to block 502 of FIG. 5A.

Figure 6:
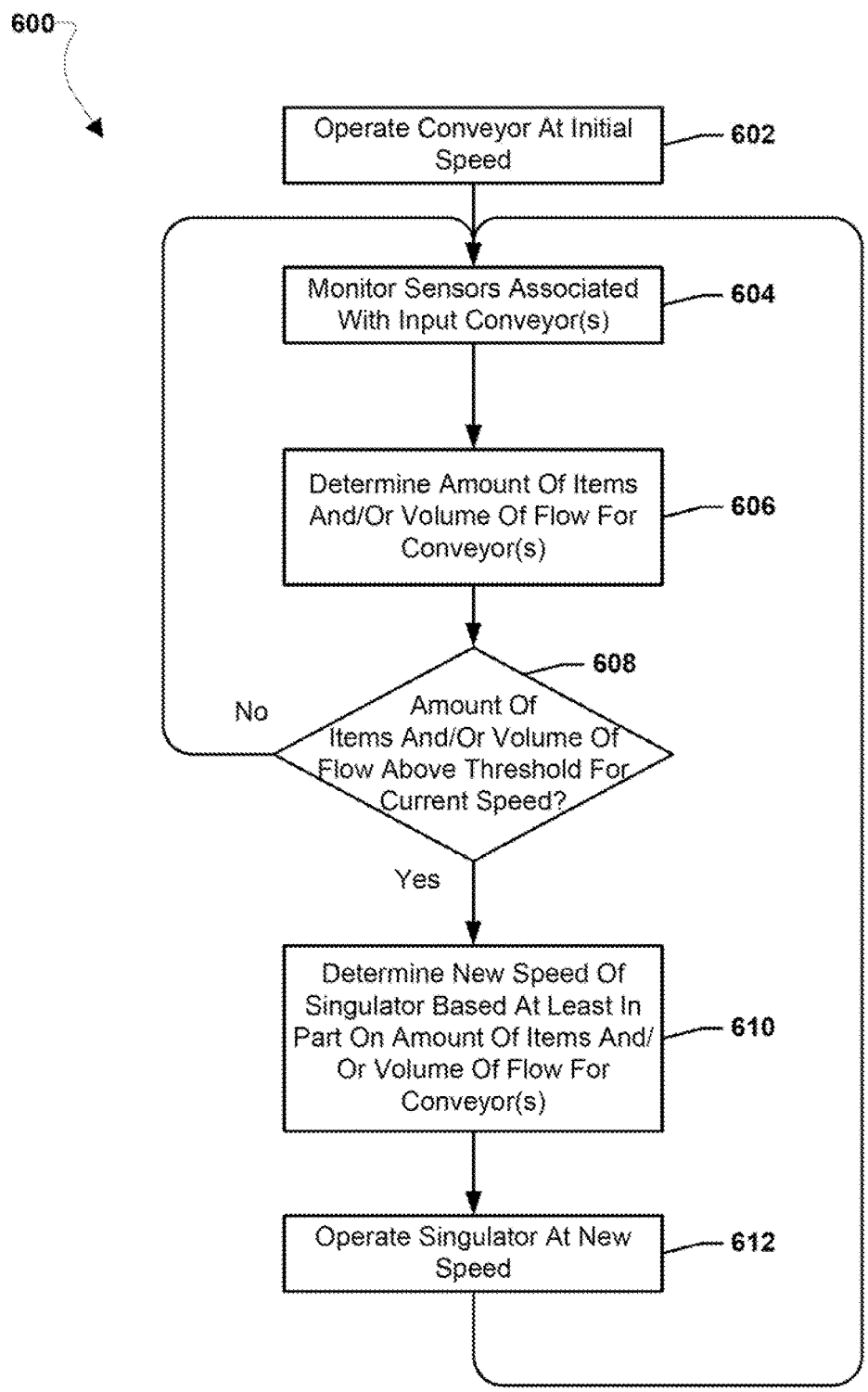
FIG. 6 is a process flow diagram illustrating an embodiment method for controlling the speed of a singulator based at least in part on an amount of items and/or volume of flow from one or more input conveyors.

FIG. 6 is illustrates an embodiment method 600 for controlling the speed of a singulator based at least in part on an amount of items and/or volume of flow from one or more input conveyors. In an embodiment, the operations of method 600 may be performed by a processor of a conveyor controller configured to control the operations (e.g., speed or run rate) of a singulator in a material handling system). In an embodiment, the processor of the controller may perform one or more operations of method 600 to determine whether one or more material handling system state inputs meet speed change (or run rate change) requirements for the singulator and determine a new speed (or run rate) for the singulator.

In block 602 the processor may operate the singulator at a default speed (or run rate). In block 604 the processor may monitor sensors associated with the input conveyors that provide items to the singulator. For example, the sensors may be photoelectric sensors monitoring portions of the input conveyors that output indications as items pass onto the input conveyors. The sensors may output sensor data (e.g., indications of the items on the input conveyors) to the processor and in block 606 the processor may determine the amount of items and/or volume of flow for the input conveyors based on the sensor data from the monitored sensors. For example, using position tracking of the items indicated by the sensors the processor may determine a loading level or volume of flow of items coming from the input conveyors to the singulator. In determination block 608 the processor may determine whether the amount of items and/or volume of flow of items from the input conveyors is above a threshold for the current speed of the singulator. As an example, speeds of the singulator may be related to threshold values in a memory available to the processor, such as in a data table. Each threshold value may indicate an amount of items and/or volume of flow that may represent an amount or volume that would justify increasing the speed of the singulator. Amounts or volumes that may justify increasing the speed of the singulator may be amounts or volumes of items that may be handled more efficiently (e.g., with less item recirculation) by the singulator when operating at a higher speed. These amounts or volumes and their related speeds may be predetermined and stored in the memory available to the processor. The processor may determine whether the amount of items and/or volume of flow of items from the input conveyors is above a threshold for the current speed of the singulator by comparing the threshold value correlated with the current speed setting of the singulator in the data table to the determined amount of items and/or volume of flow of items from the conveyor.

In response to determining the amount of items and/or volume of flow of items is not above the threshold for the current speed (i.e., determination block 608="No"), the processor may continue to monitor the sensors associated with the input conveyors in block 604. In response to determining the amount of items and/or volume of flow of items is above the threshold for the current speed (i.e., determination block 608="Yes"), in block 610 the processor may determine a new speed of the singulator based at least in part on the amount of items and/or volume of flow for the conveyors. As an example, a data table stored in memory may correlate optimal speeds of the singulator with amounts or volumes of items, and the processor may select the new speed as the speed correlated with the determined amount or volume of items. As another example, the processor may select a function for controlling the speed of the singulator and the determined amount of items or volume of flow of items may be an input to the function which may output a resulting singulator speed. In block 612 the processor may operate the singulator at the new speed. For example, the processor may send a speed setting command to the motor or motors of the singulator to operate the new speed of the singulator. The method 600 may proceed to block 604 to monitor the sensors associated with the input conveyors. In this manner, the speed of the singulator may be continually monitored and dynamically adjusted based at least in part on the items being input to the conveyor.

Figure 7:
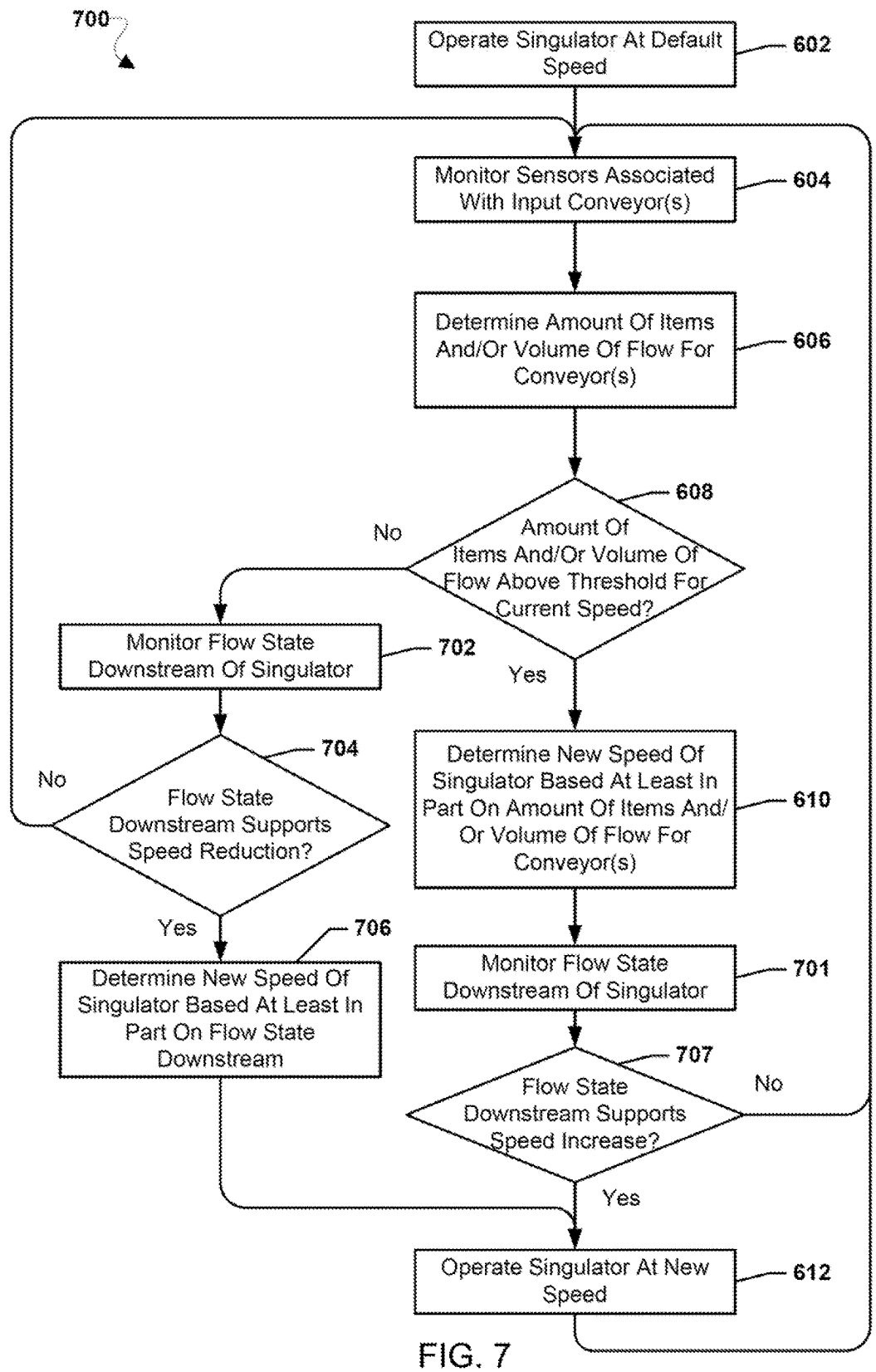
FIG. 7 is a process flow diagram illustrating an embodiment method for controlling the speed of a singulator based at least in part on a flow state downstream of the singulator.

FIG. 7 is a process flow diagram illustrating an embodiment method 700 for controlling the speed of a singulator based at least in part on a flow state downstream of the singulator. In an embodiment, the processor of the controller may perform one or more operations of method 700 to determine whether one or more material handling system state inputs meet speed change (or run rate change) requirements for the singulator and determine a new speed (or run rate) for the singulator. In an embodiment, the operations of method 700 may be performed by a processor of a conveyor controller configured to control the operations (e.g., speed or run rate) of a singulator in a material handling system. In blocks 602, 604, 606, 608, 610, the processor may perform like operations of like numbered blocks of method 600 described above in FIG. 6. Upon determining a new speed in block 610, in block 701 the processor may monitor the flow state downstream of the singulator. As an example, the processor may monitor sensors associated with a sorter, such as a slide shoe sorter, and/or divert conveyors downstream of the singulator to monitor the flow state downstream of the singulator. As another example, the processor may receive data about the flow state downstream of the singulator from a WMS to monitor the flow state downstream of the singulator. In an embodiment, the flow state downstream may be further based on labor levels downstream. For example, the staffing level in a shipping area may constrain the amount of items and/or volume of flow of items that may be handled in a shipping area. In determination block 707 the processor may determine whether the flow state downstream of the singulator supports a speed increase of the singulator. For example, flow states downstream of the singulator may be correlated with thresholds values in a memory available to the processor, such as in a data table, and when a flow state downstream of the singulator is at or above a threshold value the flow state may be determined to support speed increase. For example, when excess capacity on a sorter or excess capacity in a packing area based on staffing levels is identified the downstream flow state may support a speed increase and when a sorter is at maximum speed or a packing area is understaffed the flow state may not support a speed increase. In response to determining the flow state does not support speed increase (i.e., determination block 707="No"), the speed of the singulator may not be changed, and in block 604 the processor may continue to monitor the sensors associated with the input conveyors. In response to determining the flow state does support the speed increase to the determined new speed (i.e., determination block 707="Yes"), the singulator may be operated at the new speed in block 612.

In response to determining the amount of items and/or volume of flow of items is not above the threshold for the current speed (i.e., determination block 608="No"), in block 702 the processor may monitor the flow state downstream of the singulator. As an example, the processor may monitor sensors associated with a sorter, such as a slide shoe sorter, and/or divert conveyors downstream of the singulator to monitor the flow state downstream of the singulator. As another example, the processor may receive data about the flow state downstream of the singulator from a WMS to monitor the flow state downstream of the singulator. In an embodiment, the flow state downstream may be further based on labor levels downstream. For example, the staffing level in a shipping area may constrain the amount of items and/or volume of flow of items that may be handled in a shipping area. In determination block 704 the processor may determine whether the flow state downstream of the singulator supports a speed reduction of the singulator. For example, flow states downstream of the singulator may be correlated with thresholds values in a memory available to the processor, such as in a data table, and when a flow state downstream of the singulator is below a threshold value the flow state may be determined to support speed reduction. In response to determining the flow state does not support speed reduction (i.e., determination block 704="No"), the speed of the singulator may not be changed, and in block 604 the processor may continue to monitor the sensors associated with the input conveyors.

In response to determining the flow state does support speed reduction (i.e., determination block 704="Yes"), in block 706 the processor may determine a new speed of the singulator based at least in part on the flow state downstream. As an example, the flow state downstream values may be correlated with singulator speed settings in a memory available to the processor, and the processor may select the new speed as the speed correlated with the determined flow state downstream. As another example, the processor may select a function for controlling the speed of the singulator and the determined flow state downstream may be an input to the function which may output a resulting singulator speed. In block 612 the processor may operate the singulator at the new speed. For example, the processor may send a speed setting command to the motor or motors of the singulator to operate the new speed of the singulator. The method 700 may proceed to block 604 to monitor the sensors associated with the input conveyors. In this manner, the speed of the singulator may be continually monitored and dynamically adjusted based at least in part on the items being input to the conveyor and/or the flow state downstream of the singulator.

Figure 8:
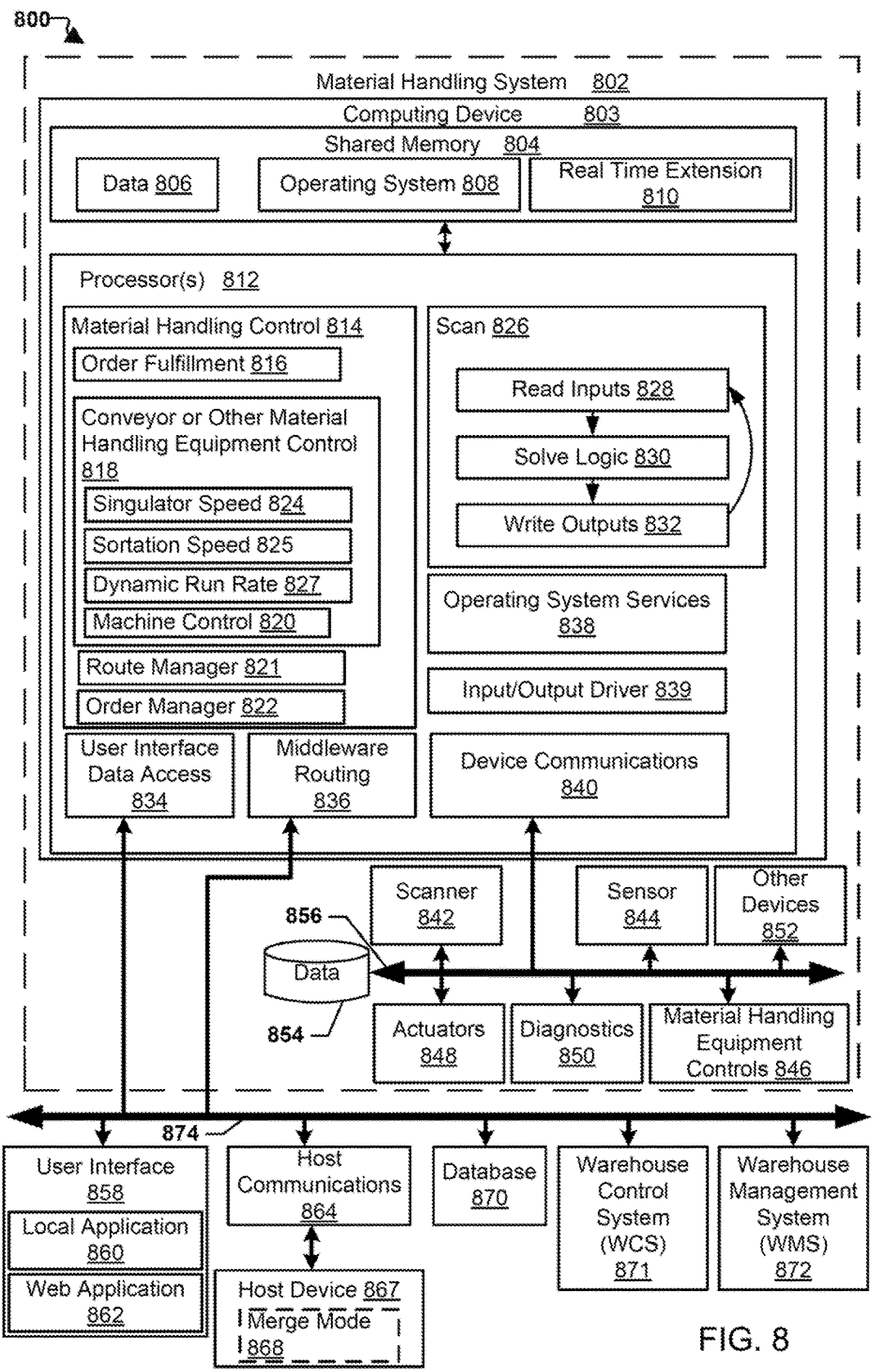
FIG. 8 illustrates an exemplary processing architecture of a material handling system suitable for use with the various embodiments.

FIG. 8 illustrates an exemplary processing architecture 800 of a material handling system 802 suitable for use with the various embodiments. The processing architecture 800 may be implemented in hardware, software, or combinations of hardware and software in one computing device or across a series of computing devices in communication with each other as needed to perform the functionality described herein.

The material handling system 802 may include a computing device 803 including a processor readable shared memory 804 connected to one or more processors 812. The one or more processors may function as controllers for the material handling system 802. For example, one processor may be a primary controller while another may serve as a backup controller that may be swapped for the primary controller automatically or by maintenance personnel in the event of a failure without undue service downtime. The shared memory 804 may include an operating system (e.g., Windows, Linux, etc.) and real time extension 810.

The one or more processors 812 may execute various logical layers, applications, or modules including a material handling controls 814, scans 826, user interface data access 834, middleware routing 836, device communications 840, operating system services 838, and input/output drivers 839. The various logical layers, applications, or modules including material handling controls 814, scans 826, user interface data access 834, middleware routing 836, device communications 840, operating system services 838, and/or input/output drivers 839 may be executed in conjunction with one another and exchange data with one another. As the one or more processors receive inputs (e.g., signals from switches, photo eyes, etc., data messages, or other various input types) the various logical layers, applications, or modules including material handling controls 814, scans 826, user interface data access 834, middleware routing 836, device communications 840, operating system services 838, and/or input/output drivers 839 may be executed individually and/or in concert by the one or more processors 812 to generate outputs (e.g., electrical signals to motor contacts, solenoid valves, switches, lamps, etc., data messages, or other output types).

Scans 826 may be repeatedly executed by the one or more processors 812 and may include a read inputs module 828, a solve logic module 830, and a write outputs module 832. By executing the various logical operations of the modules 828, 830, and 832 on a regular period basis the scans 826 may be counted to measure time. The solve logic module 830 may incorporate any type of logic, including "if-then-else" branching logic, motion control logic, simple logic, sophisticated logic, hard lined logic, configured logic, etc. Data used by the solve logic module 830 may reside in the shared memory 804, such as data 806, or a local, remote, or cloud-based data storage device, such as data store 854. Scans 826 may be performed at different intervals, for example scans for motion control may occur every 1 millisecond to 2 milliseconds, scans for merge subsystems may occur every 5 milliseconds, and general conveyor scans may occur every 25 milliseconds.

Material handling controls 814 may include order fulfillment module 816, conveyor or other material handling equipment control module 818 including a machine control module 820 to generate instructions for conveyors and/or other material handling equipment, singulator speed control module 824 to monitor conditions and adjust speeds for singulators within a material handling system (e.g., a distribution center), sortation speed control module 825 to monitor conditions and adjust speeds for sorters within the material handling system, and a dynamic run rate or usage driven run rate module 827 to adjust the conveyor or other material handling equipment run rates, as well as an order manager module 822 and route manager module 821.

The one or more processor 812 may exchange data with scanners 842, sensors 844, actuators 848, diagnostic systems 850, material handling equipment controls 846 (such as conveyor controls), data store 854, and other devices 852 (e.g., scales, printers, etc.) via network connections 856 (e.g., TCP/IP connections, Ethernet connections, Ethercat connections, PROFIBUS connections, RS 232 connections, USB connections, Wi-Fi connections, cellular connections, etc.). The processing architecture 800 may include other systems interfacing with the material handling system 802 via network connections 874 (e.g., TCP/IP connections, Ethernet connections, Ethercat connections, PROFIBUS connections, RS 232 connections, USB connections, Wi-Fi connections, cellular connections, etc.), such as user interface devices 858 (e.g., a display, user terminal, etc.) displaying a local application 860 or web application 862, host communication devices 864 enabling communication with a host device 867 (e.g., via FTP, TCP/IP, etc.), a database 870, a warehouse control system (WCS) 871, and/or a warehouse management system (WMS) 872 or other external system (e.g., LMS). A host device may also include a merge mode module or application 868 which may transmit information related to the merging operations of containers to the one or more processors 812 of the material handling system 802.

Figure 9:
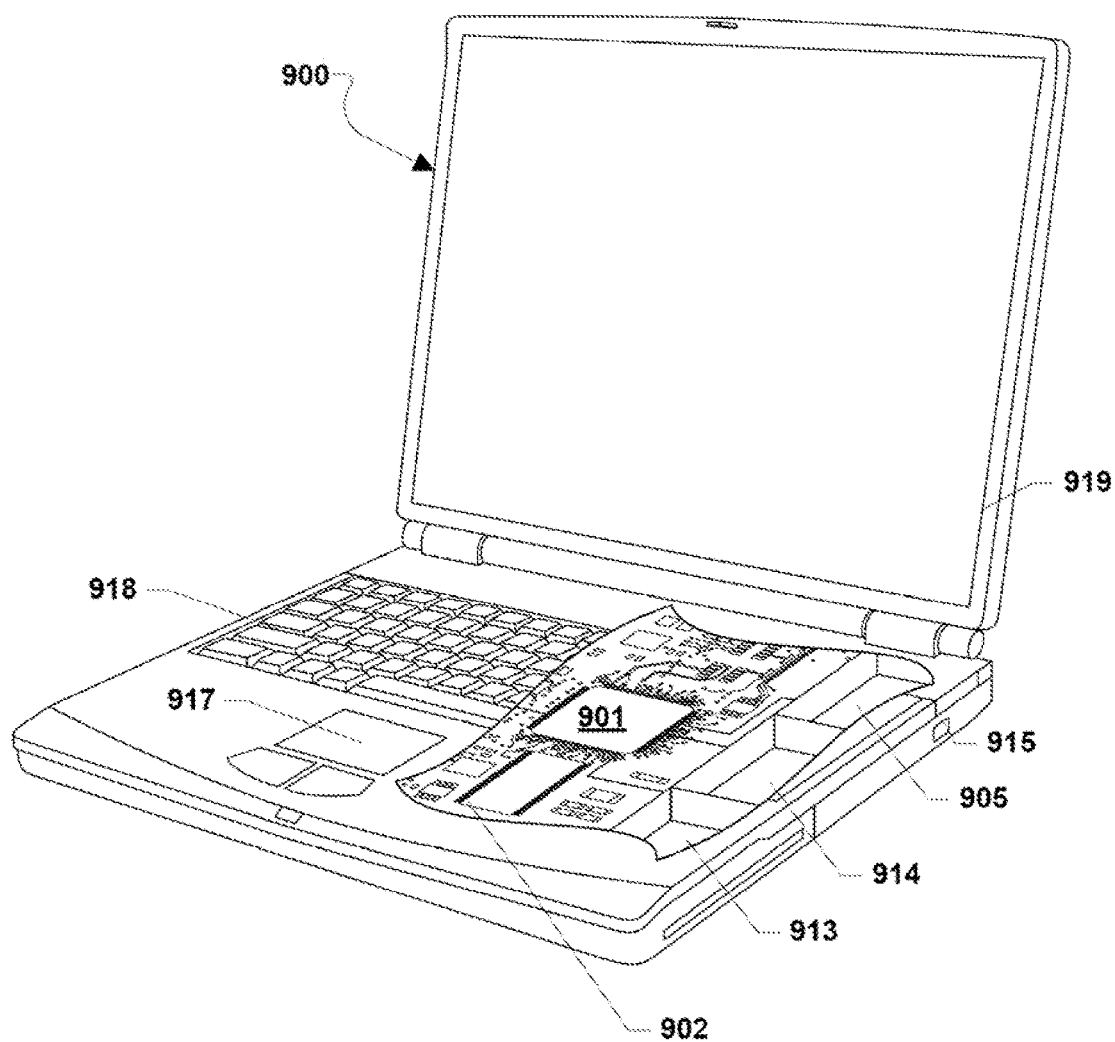
FIG. 9 is a component block diagram of an example laptop computing device suitable for use with the various embodiments.

The various embodiments may be implemented in any of a variety of computing devices, an example of which is illustrated in FIG. 9. A computing device 900 will typically include a processor 901 coupled to volatile memory 902 and a large capacity nonvolatile memory, such as a disk drive 905 of Flash memory. The computing device 900 may also include a floppy disc drive 913 and a compact disc (CD) drive 914 coupled to the processor 901. The computing device 900 may also include a number of connector ports 915 coupled to the processor 901 for establishing data connections or receiving external memory devices, such as a USB or FireWire® connector sockets, or other network connection circuits for establishing network interface connections from the processor 901 to a network or bus, such as a local area network coupled to other computers and servers, the Internet, the public switched telephone network, and/or a cellular data network. The computing device 900 may also include the trackball or touch pad 917, keyboard 918, and display 919 all coupled to the processor 901.

Figure 10:
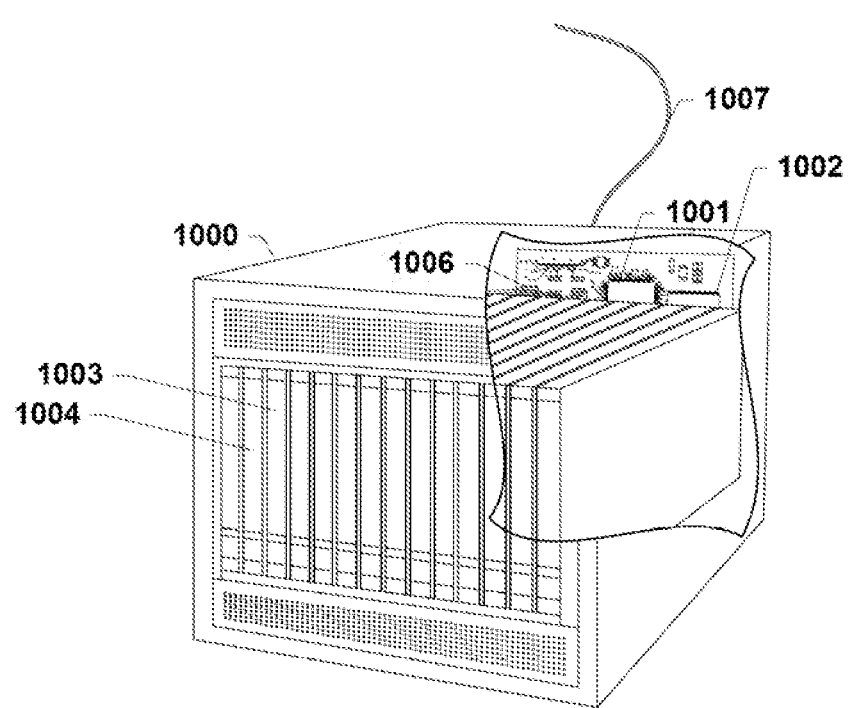
FIG. 10 is a component block diagram of a server computing device suitable for use in an embodiment.

The various embodiments may also be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1006 coupled to the processor 1001 for establishing network interface connections with a network 1007, such as a local area network coupled to other computers and servers, the Internet, the public switched telephone network, and/or a cellular data network.

The processors 118, 812, 901, and 1001 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 120, 804, 902, 905, 1002, and 1003 before they are accessed and loaded into the processors 118, 812, 901, and 1001. The processors 118, 812, 901, and 1001 may include internal memory sufficient to store the application software instructions. In many devices the internal memory may be a volatile or nonvolatile memory, such as flash memory, or a mixture of both. For the purposes of this description, a general reference to memory refers to memory accessible by the processors 118, 812, 901, and 1001 including internal memory or removable memory plugged into the device and memory within the processor 118, 812, 901, and 1001 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for operating a material handling system including a conveyor system, comprising:
determining whether a material handling system state input meets a speed change requirement for the conveyor system;
determining a new speed for the conveyor system in response to determining the material handling system state input meets the speed change requirement for the conveyor system; and
operating the conveyor system at the new speed,
wherein:
  the conveyor system is a sortation system; and
  determining whether a material handling system state input meets a speed change requirement for the conveyor system comprises:
    determining a maximum throughput value of the sortation system at a first run rate;
    monitoring an actual throughput value of the sortation system at the first run rate;
    comparing a ratio of the actual throughput value to the maximum throughput value with a first threshold; and
    determining the material handling system state input meets the speed change requirement in response to the ratio being greater than the first threshold.

2. The method of claim 1, further comprising:
comparing the ratio with a second threshold that is lower than the first threshold; and
determining the material handling system state input meets the speed change requirement in response to the ratio being less than the second threshold,
wherein determining a new speed for the conveyor system in response to determining the material handling system state input meets the speed change requirement for the conveyor system comprises:
  determining a new speed for the sortation system that is greater than the first run rate in response to the ratio being greater than the first threshold; and
  determining a new speed for the sortation system that is less than the first run rate in response to the ratio being less than the second threshold.

3. The method of claim 1, wherein monitoring an actual throughput value of the sortation system at the first run rate comprises monitoring the actual throughput value of the sortation system at the first run rate for a time period greater than one minute.

4. The method of claim 1, wherein the material handling system state input is selected from the group consisting of a labor input, a current work input, an estimated completion time, a work characteristic, and an electric pricing period.

5. A material handling system comprising:
a conveyor system; and
a controller, comprising:
  an interface in communication with the conveyor system; and
  a processor coupled to the interface, wherein the processor is configured with processor-executable instructions to perform operations comprising:
    determining whether a material handling system state input meets a speed change requirement for the conveyor system;
    determining a new speed for the conveyor system in response to determining the material handling system state input meets the speed change requirement for the conveyor system; and
    operating the conveyor system at the new speed,
  wherein:
    the conveyor system is a sortation system; and the processor is configured with processor-executable instructions to perform operations such that:
  determining whether a material handling system state input meets a speed change requirement for the conveyor system comprises:
    determining a maximum throughout value of the sortation system at a first run rate;
    monitoring an actual throughput value of the sortation system at the first run rate;
    comparing a ratio of the actual throughput value to the maximum throughput value with a first threshold; and
    determining the material handling system state input meets the speed change requirement in response to the ratio being greater than the first threshold.

6. The material handling system of claim 5, wherein: the processor is configured with processor-executable instructions to perform operations further comprising:
  comparing the ratio with a second threshold that is lower than the first threshold; and
  determining the material handling system state input meets the speed change requirement in response to the ratio being less than the second threshold; and
  the processor is configured with processor-executable instructions to perform operations such that determining a new speed for the conveyor system in response to determining the material handling system state input meets the speed change requirement for the conveyor system comprises:
    determining a new speed for the sortation system that is greater than the first run rate in response to the ratio being greater than the first threshold; and determining a new speed for the sortation system that is less than the first run rate in response to the ratio being less than the second threshold.

7. The material handling system of claim 5, wherein the processor is configured with processor-executable instructions to perform operations such that monitoring an actual throughput value of the sortation system at the first run rate comprises monitoring the actual throughput value of the sortation system at the first run rate for a time period greater than one minute.

8. The material handling system of claim 5, wherein:
the conveyor system is a sortation system; and
the processor is configured with processor-executable instructions to perform operations such that:
  determining whether a material handling system state input meets a speed change requirement for the conveyor system comprises:
    monitoring an unavailability value of aftersort destinations of the sortation system; and
    determining the material handling system state input meets the speed change requirement in response to the unavailability value exceeding a first recirculation threshold or a second recirculation threshold; and
  determining a new speed for the conveyor system in response to determining the material handling system state input meets the speed change requirement for the conveyor system comprises:
    determining a new speed for the sortation system that is less than a current speed in response to the unavailability value exceeding the first recirculation threshold; and
    reducing indications to the sortation system in response to the unavailability value exceeding the second recirculation threshold.

9. The material handling system of claim 5, wherein the processor is configured with processor-executable instructions to perform operations such that the material handling system state input is selected from the group consisting of a labor input, a current work input, an estimated completion time, a work characteristic, and an electric pricing period.

10. A non-transitory processor readable medium having stored thereon processor-executable instructions configured to cause a processor to perform operations comprising:
  determining whether a material handling system state input meets a speed change requirement for a conveyor system;
  determining a new speed for the conveyor system in response to determining the material handling system state input meets the speed change requirement for the conveyor system; and
  operating the conveyor system at the new speed,
  wherein the stored processor-executable instructions are configured to cause a processor to perform operations such that: the conveyor system is a sortation system; and determining whether a material handling system state input meets a speed change requirement for the conveyor system comprises:
    determining a maximum throughput value of the sortation system at a first run rate;
    monitoring an actual throughput value of the sortation system at the first run rate;
    comparing a ratio of the actual throughput value to the maximum throughput value with a first threshold; and
    determining the material handling system state input meets the speed change requirement in response to the ratio being greater than the first threshold.

11. The non-transitory processor-readable medium of claim 10, wherein:
  the stored processor-executable instructions are configured to cause a processor to perform operations further comprising:
    comparing the ratio with a second threshold that is lower than the first threshold; and
    determining the material handling system state input meets the speed change requirement in response to the ratio being less than the second threshold; and the stored processor-executable instructions are configured to cause a processor to perform operations such that determining a new speed for the conveyor system in response to determining the material handling system state input meets the speed change requirement for the conveyor system comprises:
      determining a new speed for the sortation system that is greater than the first run rate in response to the ratio being greater than the first threshold; and
      determining a new speed for the sortation system that is less than the first run rate in response to the ratio being less than the second threshold.

12. The non-transitory processor-readable medium of claim 10, wherein the stored processor-executable instructions are configured to cause a processor to perform operations such that monitoring an actual throughput value of the sortation system at the first run rate comprises monitoring the actual throughput value of the sortation system at the first run rate for a time period greater than one minute.

13. The non-transitory processor-readable medium of claim 10, wherein the stored processor-executable instructions are configured to cause a processor to perform operations such that the material handling system state input is selected from the group consisting of a labor input, a current work input, an estimated completion time, a work characteristic, and an electric pricing period.

14. A method for operating a material handling system including a conveyor system, comprising:
   determining whether a material handling system state input meets a speed change requirement for the conveyor system;
   determining a new speed for the conveyor system in response to determining the material handling system state input meets the speed change requirement for the conveyor system; and
   operating the conveyor system at the new speed,
   wherein:
      the conveyor system is a sortation system;
      determining whether a material handling system state input meets a speed change requirement for the conveyor system comprises:
         monitoring an unavailability value of aftersort destinations of the sortation system; and
         determining the material handling system state input meets the speed change requirement in response to the unavailability value exceeding a first recirculation threshold or a second recirculation threshold; and
      determining a new speed for the conveyor system in response to determining the material handling system state input meets the speed change requirement for the conveyor system comprises:
         determining a new speed for the sortation system that is less than a current speed in response to the unavailability value exceeding the first recirculation threshold; and
         reducing inductions to the sortation system in response to the unavailability value exceeding the second recirculation threshold.

15. A non-transitory processor readable medium having stored thereon processor-executable instructions configured to cause a processor to perform operations comprising:
   determining whether a material handling system state input meets a speed change requirement for a conveyor system;
   determining a new speed for the conveyor system in response to determining the material handling system state input meets the speed change requirement for the conveyor system; and
   operating the conveyor system at the new speed,
   wherein the stored processor-executable instructions are configured to cause a processor to perform operations such that:
      the conveyor system is a sortation system;
      determining whether a material handling system state input meets a speed change requirement for the conveyor system comprises:
         monitoring an unavailability value of aftersort destinations of the sortation system; and
         determining the material handling system state input meets the speed change requirement in response to the unavailability value exceeding a first recirculation threshold or a second recirculation threshold; and
      determining a new speed for the conveyor system in response to determining the material handling system state input meets the speed change requirement for the conveyor system comprises:
         determining a new speed for the sortation system that is less than a current speed in response to the unavailability value exceeding the first recirculation threshold; and
         reducing inductions to the sortation system in response to the unavailability value exceeding the second recirculation threshold.

16. A method for operating a material handling system including a conveyor system, comprising:
   determining whether a material handling system state input meets a speed change requirement for the conveyor system;
   determining a new speed for the conveyor system in response to determining the material handling system state input meets the speed change requirement for the conveyor system; and
   operating the conveyor system at the new speed,
   wherein:
      the conveyor system is a sortation system;
      determining whether a material handling system state input meets a speed change requirement for the conveyor system comprises determining the material handling system state input meets the speed change requirement in response to an accumulated quantity on an accumulation lane that inducts to the sortation system exceeding a fullness threshold or in response to receiving an alert of an impending increase in a quantity of inventory to be conveyed to the accumulation lane; and
      the new speed for the sortation system is greater than a current speed.

17. A material handling system comprising:
   a conveyor system; and
   a controller, comprising:
      an interface in communication with the conveyor system; and
      a processor coupled to the interface, wherein the processor is configured with processor-executable instructions to perform operations comprising:
         determining whether a material handling system state input meets a speed change requirement for the conveyor system;
         determining a new speed for the conveyor system in response to determining the material handling system state input meets the seed change requirement for the conveyor system; and
         operating the conveyor system at the new speed,
      wherein:
         the conveyor system is a sortation system; and
         the processor is configured with processor-executable instructions to perform operations such that:
            determining whether a material handling system state input meets a speed change requirement for the conveyor system comprises determining the material handling system state input meets the speed change requirement in response to an accumulated quantity on an accumulation lane that inducts to the sortation system exceeding a fullness threshold or in response to receiving an alert of an impending increase in a quantity of inventory to be conveyed to the accumulation lane; and
            the new speed for the sortation system is greater than a current speed.

18. A non-transitory processor readable medium having stored thereon processor-executable instructions configured to cause a processor to perform operations comprising:

determining whether a material handling system state input meets a speed change requirement for a conveyor system;
determining a new speed for the conveyor system in response to determining the material handling system state input meets the speed change requirement for the conveyor system; and
operating the conveyor system at the new speed,
wherein the stored processor-executable instructions are configured to cause a processor to perform operations such that:
the conveyor system is a sortation system;
determining whether a material handling system state input meets a speed change requirement for the conveyor system comprises determining the material handling system state input meets the speed change requirement in response to an accumulated quantity on an accumulation lane that inducts to the sortation system exceeding a fullness threshold or in response to receiving an alert of an impending increase in a quantity of inventory to be conveyed to the accumulation lane; and
the new speed for the sortation system is greater than a current speed.

19. A method for operating a material handling system including a conveyor system, comprising:
determining whether a material handling system state input meets a speed change requirement for the conveyor system;
determining a new speed for the conveyor system in response to determining the material handling system state input meets the speed change requirement for the conveyor system; and
operating the conveyor system at the new speed,
wherein:
the conveyor system is a sortation system;
determining whether a material handling system state input meets a speed change requirement for the conveyor system comprises:
monitoring a usage level of a recirculation conveyor;
determining whether the usage level exceeds a threshold; and
determining the material handling system state input meets the speed change requirement in response to determining that the usage level exceeds the threshold; and
the new speed for the sortation system is less than a current speed.

20. The method of claim 19, wherein monitoring a usage level of a recirculation conveyor comprises monitoring a current fullness level of the recirculation conveyor.

21. The method of claim 19, wherein:
monitoring a usage level of a recirculation conveyor comprises determining a projected fullness level of the recirculation conveyor based upon a quantity of inducted objects destined for the recirculation conveyor; and
determining whether the usage level exceeds a threshold comprises determining whether the projected fullness level of the recirculation conveyor exceeds a threshold.

22. The method of claim 19, further comprising stopping induction of items on the sortation system, wherein the new speed for the sortation system corresponds to a reduced run rate of the recirculation conveyor.

23. A material handling system comprising:
a conveyor system; and
a controller, comprising:
an interface in communication with the conveyor system; and
a processor coupled to the interface, wherein the processor is configured with processor-executable instructions to perform operations comprising:
determining whether a material handling system state input meets a speed change requirement for the conveyor system;
determining a new speed for the conveyor system in response to determining the material handling system state input meets the speed change requirement for the conveyor system; and
operating the conveyor system at the new speed,
wherein:
the conveyor system is a sortation system; and
the processor is configured with processor-executable instructions to perform operations such that:
determining whether a material handling system state input meets a speed change requirement for the conveyor system comprises:
monitoring a usage level of a recirculation conveyor;
determining whether the usage level exceeds a threshold; and
determining the material handling system state input meets the speed change requirement in response to determining that the usage level exceeds the threshold; and
the new speed for the sortation system is less than a current speed.

24. The material handling system of claim 23, wherein the processor is configured with processor-executable instructions to perform operations such that monitoring a usage level of a recirculation conveyor comprises monitoring a current fullness level of the recirculation conveyor.

25. The material handling system of claim 23, wherein the processor is configured with processor-executable instructions to perform operations such that:
monitoring a usage level of a recirculation conveyor comprises determining a projected fullness level of the recirculation conveyor based upon a quantity of inducted objects destined for the recirculation conveyor; and
determining whether the usage level exceeds a threshold comprises determining whether the projected fullness level of the recirculation conveyor exceeds a threshold.

26. The material handling system of claim 23, wherein:
the processor is configured with processor-executable instructions to perform operations further comprising stopping induction of items on the sortation system; and
the processor is configured with processor-executable instructions to perform operations such that the new speed for the sortation system corresponds to a reduced run rate of the recirculation conveyor.

27. A non-transitory processor readable medium having stored thereon processor-executable instructions configured to cause a processor to perform operations comprising:
determining whether a material handling system state input meets a speed change requirement for a conveyor system;
determining a new speed for the conveyor system in response to determining the material handling system state input meets the speed change requirement for the conveyor system; and
operating the conveyor system at the new speed, wherein the stored processor-executable instructions are configured to cause a processor to perform operations such that:
the conveyor system is a sortation system;
determining whether a material handling system state input meets a speed change requirement for the conveyor system comprises:
monitoring a usage level of a recirculation conveyor;
determining whether the usage level exceeds a threshold; and
determining the material handling system state input meets the speed change requirement in response to determining that the usage level exceeds the threshold; and
the new speed for the sortation system is less than a current speed.

28. The non-transitory processor-readable medium of claim 27, wherein the stored processor-executable instructions are configured to cause a processor to perform operations such that monitoring a usage level of a recirculation conveyor comprises monitoring a current fullness level of the recirculation conveyor.

29. The non-transitory processor-readable medium of claim 27, wherein the stored processor-executable instructions are configured to cause a processor to perform operations such that:
monitoring a usage level of a recirculation conveyor comprises determining a projected fullness level of the recirculation conveyor based upon a quantity of inducted objects destined for the recirculation conveyor; and
determining whether the usage level exceeds a threshold comprises determining whether the projected fullness level of the recirculation conveyor exceeds a threshold.

30. The non-transitory processor-readable medium of claim 27, wherein:
the stored processor-executable instructions are configured to cause a processor to perform operations further comprising stopping induction of items on the sortation system; and
the stored processor-executable instructions are configured to cause a processor to perform operations such that the new speed for the sortation system corresponds to a reduced run rate of the recirculation conveyor.

31. A method for operating a material handling system including a conveyor system, comprising:
determining whether a material handling system state input meets a speed change requirement for the conveyor system;
determining a new speed for the conveyor system in response to determining the material handling system state input meets the speed change requirement for the conveyor system; and
operating the conveyor system at the new speed,
wherein:
the conveyor system is a singulator; and
determining whether a material handling system state input meets a speed change requirement for the conveyor system comprises:
determining a volume of flow of items on an input conveyor to the singulator;
determining whether the volume of flow of items is above a threshold for a current speed of the singulator; and
determining the material handling system state input meets the speed change requirement in response to determining the volume of flow of items is above the threshold for the current speed of the singulator.

32. The method of claim 31, wherein determining a volume of flow of items on an input conveyor to the singulator comprises: receiving sensor data from a sensor associated with an input conveyor to the singulator; and determining a volume of flow of items on the input conveyor based at least in part on the received sensor data.

33. The method of claim 31, wherein:
determining whether a material handling system state input meets a speed change requirement for the conveyor system further comprises:
determining whether a flow state downstream of the singulator supports reducing the current speed of the singulator in response to determining the volume of flow of items is not above the threshold for the current speed of the singulator;
determining the material handling system state input meets the speed change requirement in response to determining the flow state downstream of the singulator supports reducing the current speed of the singulator;
the new speed for the singulator is greater than a current speed when the volume of flow of items is above the threshold for the current speed of the singulator; and
the new speed for the singulator is less than the current speed when the flow state downstream of the singulator supports reducing the current speed of the singulator.

34. The method of claim 33, wherein the flow state downstream of the singulator is a loading level of a sorter.

35. A material handling system comprising:
a conveyor system; and
a controller, comprising:
an interface in communication with the conveyor system; and
a processor coupled to the interface, wherein the processor is configured with processor-executable instructions to perform operations comprising:
determining whether a material handling system state input meets a speed change requirement for the conveyor system;
determining a new speed for the conveyor system in response to determining the material handling system state input meets the speed change requirement for the conveyor system; and
operating the conveyor system at the new speed,
wherein:
the conveyor system is a singulator; and
the processor is configured with processor-executable instructions to perform operations such that determining whether a material handling system state input meets a speed change requirement for the conveyor system comprises:
determining a volume of flow of items on an input conveyor to the singulator;
determining whether the volume of flow of items is above a threshold for a current speed of the singulator; and
determining the material handling system state input meets the speed change requirement in response to determining the volume of flow of items is above the threshold for the current speed of the singulator.

36. The material handling system of claim 35, wherein the processor is configured with processor-executable instructions to perform operations such that determining a volume of flow of items on an input conveyor to the singulator comprises:
receiving sensor data from a sensor associated with an input conveyor to the singulator; and
determining a volume of flow of items on the input conveyor based at least in part on the received sensor data.

37. The material handling system of claim 35, wherein the processor is configured with processor-executable instructions to perform operations such that:
determining whether a material handling system state input meets a speed change requirement for the conveyor system further comprises:
determining whether a flow state downstream of the singulator supports reducing the current speed of the singulator in response to determining the volume of flow of items is not above the threshold for the current speed of the singulator;
determining the material handling system state input meets the speed change requirement in response to determining the flow state downstream of the singulator supports reducing the current speed of the singulator;
the new speed for the singulator is greater than a current speed when the volume of flow of items is above the threshold for the current speed of the singulator; and
the new speed for the singulator is less than the current speed when the flow state downstream of the singulator supports reducing the current speed of the singulator.

38. The material handling system of claim 37, wherein the processor is configured with processor-executable instructions to perform operations such that the flow state downstream of the singulator is a loading level of a sorter.

39. A non-transitory processor readable medium having stored thereon processor-executable instructions configured to cause a processor to perform operations comprising:
determining whether a material handling system state input meets a speed change requirement for a conveyor system;
determining a new speed for the conveyor system in response to determining the material handling system state input meets the speed change requirement for the conveyor system; and
operating the conveyor system at the new speed,
wherein the stored processor-executable instructions are configured to cause a processor to perform operations such that:
the conveyor system is a singulator; and
determining whether a material handling system state input meets a speed change requirement for the conveyor system comprises:
determining a volume of flow of items on an input conveyor to the singulator;
determining whether the volume of flow of items is above a threshold for a current speed of the singulator; and
determining the material handling system state input meets the speed change requirement in response to determining the volume of flow of items is above the threshold for the current speed of the singulator.

40. The non-transitory processor-readable medium of claim 39, wherein the stored processor-executable instructions are configured to cause a processor to perform operations such that determining a volume of flow of items on an input conveyor to the singulator comprises:
receiving sensor data from a sensor associated with an input conveyor to the singulator; and
determining a volume of flow of items on the input conveyor based at least in part on the received sensor data.

41. The non-transitory processor-readable medium of claim 39, wherein the stored processor-executable instructions are configured to cause a processor to perform operations such that:
determining whether a material handling system state input meets a speed change requirement for the conveyor system further comprises:
determining whether a flow state downstream of the singulator supports reducing the current speed of the singulator in response to determining the volume of flow of items is not above the threshold for the current speed of the singulator;
determining the material handling system state input meets the speed change requirement in response to determining the flow state downstream of the singulator supports reducing the current speed of the singulator;
the new speed for the singulator is greater than a current speed when the volume of flow of items is above the threshold for the current speed of the singulator; and
the new speed for the singulator is less than the current speed when the flow state downstream of the singulator supports reducing the current speed of the singulator.

42. The non-transitory processor-readable medium of claim 41, wherein the stored processor-executable instructions are configured to cause a processor to perform operations such that the flow state downstream of the singulator is a loading level of a sorter.

* * * * *